United States Patent
Shinkawa et al.

(10) Patent No.: US 8,856,183 B2
(45) Date of Patent: Oct. 7, 2014

(54) DATABASE ACCESS USING PARTITIONED DATA AREAS

(75) Inventors: Kaoru Shinkawa, Tokyo (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 12/613,764

(22) Filed: Nov. 6, 2009

(65) Prior Publication Data

US 2010/0138442 A1 Jun. 3, 2010

(30) Foreign Application Priority Data

Nov. 28, 2008 (JP) ................. 2008-305698

(51) Int. Cl.
 *G06F 17/30* (2006.01)
 *G06F 15/16* (2006.01)
(52) U.S. Cl.
 CPC .............. *G06F 17/30923* (2013.01)
 USPC ........................... 707/797; 707/803
(58) Field of Classification Search
 USPC ................. 707/803, 797
 See application file for complete search history.

(56) References Cited

U.S. PATENT DOCUMENTS 6,519,597 B1 * 2/2003 Cheng et al. ............... 1/1
6,684,204 B1 * 1/2004 Lal ............................. 1/1

FOREIGN PATENT DOCUMENTS

| CN | 1545048 | 11/2004 |
|---|---|---|
| JP | 2007-319923 A | 8/1995 |
| JP | 2001-142752 A | 5/2001 |
| JP | 2001142752 | 5/2001 |
| JP | 2008-197815 A | 8/2008 |

OTHER PUBLICATIONS

DB2 Version 9 for Linux, UNIX, and Windows Manual—"Non-Empty Sequences Returned by XMLQuery", IBM (Last updated Oct. 27, 2006) (Last viewed Nov. 11, 2009) http://publib.boulder.ibm.com/infocenter/db2luw/v9/index.jsp?topic=/com.ibm.db2.udb.apdv.embed.doc/doc/c0023899.htm.
DB2 Version 9 for Linux, UNIX and Windows Manual—"XMLExists Predicate When Querying XML Data", IBM (Last updated Oct. 27, 2006) (Last viewed Nov. 11, 2009) http://publib.boulder.ibm.com/infocenter/db2luw/v9/index.jsp?topic=/com.ibm.db2.udb.apdv.embed.doc/doc/c0023906.htm.

* cited by examiner

*Primary Examiner* — Alex Gofman
(74) *Attorney, Agent, or Firm* — John D. Flynn; Gregory K. Goshorn; Greg Goshorn, P.C.

(57) ABSTRACT

To provide an information processing apparatus, a database system, an information processing method, and a program which ensure efficient database accesses by partitioning. The apparatus includes a partition generating unit (222) which generates a value partition in which a unit subtree including target data to be partitioned is separated and registered according to the target data, and a base partition which includes an index for uniquely identifying the unit subtree, an XML parser (224) which identifies positions of a start tag and an end tag defining an attribute value of the structured document and generates a cutting position list corresponding to the hierarchical structure of the attribute value for registration in a storage area, an XML cutting unit (226) which identifies the start tag position and the end tag position of the unit subtree to be cut, and separates the unit subtree and its index from the structured document, and a cut-XML registration unit which registers the unit subtree and the index in the separate partitions.

10 Claims, 17 Drawing Sheets

```
<branch name="A">
  <address> Shibuya, Tokyo </address>
  <order slip number="0001">
     <date> 2006/12/06 </date>
     <client code> 0001 </client code>
     <details line="1">
       <product code> 010001 </product code>
       <quantity> 10 </quantity>
     </details>
     <details line="2">
       <product code> 010002 </product code>
       <quantity> 1 </quantity>
     </details>
  </order slip>
  <order slip number="0002">
     <date> 2007/05/04 </date>
     <client code> 0001 </client code>
     <details line="1">
       <product code> 010003 </product code>
       <quantity> 2 </quantity>
     </details>
  </order slip>
</branch>
```

```
CREATE TABLE BRANCH SALES ORDER MANAGEMENT (
    ID              VARCHAR(32)         NOT NULL,
    INFOXML         XML
)

PARTITION BY RANGE (INFOXML/BRANCH/ORDER SLIP/DATE)
(
    PARTITION 2006 STARTING MINVALUE,
      PARTITION 2007 STARTING '2007/1/1'
        PARTITION 2008 STARTING '2008/1/1' , ENDING '2008/12/31'
)
```

Ex. P=/root/a/b/c

1 <root>     Path=/root, Start=/root(1), End= -1, count=(0), CutRangeSet=[]
2 <a>       Path=/root/a, Start=/root/a(2), End= -1, count=(0,0), CutRangeSet=[]
3 <b>       Path=/root/a/b, Start=/root/a/b(3), End= -1, count=(0,0,0), CutRangeSet=[]
4 <c>       Path=/root/a/b/c, Start=/root/a/b/c(4), End= -1, count=(1,1,1), CutRangeSet=[]
5 </c>      Path=/root/a/b/c, Start=/root/a/b/c(4), End=5, count=(1,1), CutRangeSet=[]
6 </b>      Path=/root/a/b, Start=/root/a/b(3), End=6, count=(1,1), CutRangeSet=[]
7 <b>       Path=/root/a/b, Start=/root/a/b(3), End=6, count=(1,1,0), CutRangeSet=[]
8 <c>       Path=/root/a/b/c, Start=/root/a/b/c(8), End= -1, count=(2,2,1), CutRangeSet=[(3, 6)]
9 </c>      Path=/root/a/b/c, Start=/root/a/b/c(8), End=9, count=(2,2,1), CutRangeSet=[(3, 6)]
10 </b>     Path=/root/a/b, Start=/root/a/b(7), End=10, count=(2,2), CutRangeSet=[(3, 6), (7,10)]
11 </a>     Path=/root/a, Start=/root/a(2), End= -1, count=(2), CutRangeSet=[(3, 6), (7,10)]
12 <a>      Path=/root/a, Start=/root/a(12), End= -1, count=(2,0), CutRangeSet=[(3, 6), (7,10)]
13 <b>      Path=/root/a/b, Start=/root/a/b(13), End= -1, count=(2,0,0), CutRangeSet=[(3, 6), (7,10)]
14 <c>      Path=/root/a/b/c, Start=/root/a/b/c(14), End= -1, count=(3,1,1), CutRangeSet=[(3, 6), (7,10)]
15 </c>     Path=/root/a/b/c, Start=/root/a/b/c(14), End=15, count=(3,1,1), CutRangeSet=[(3, 6), (7,10)]
16 </b>     Path=/root/a/b, Start=/root/a/b(13), End=16, count=(3,1), CutRangeSet=[(3, 6), (7,10)]
17 </a>     Path=/root/a, Start=/root/a(12), End=17, count=(3), CutRangeSet=[(3, 6), (7,10), (13, 16)]
18 </root>  Path=/root, Start=/, End= -1, count=(3), CutRangeSet=[(3, 6), (7,10), (13,16)]

FIG. 12

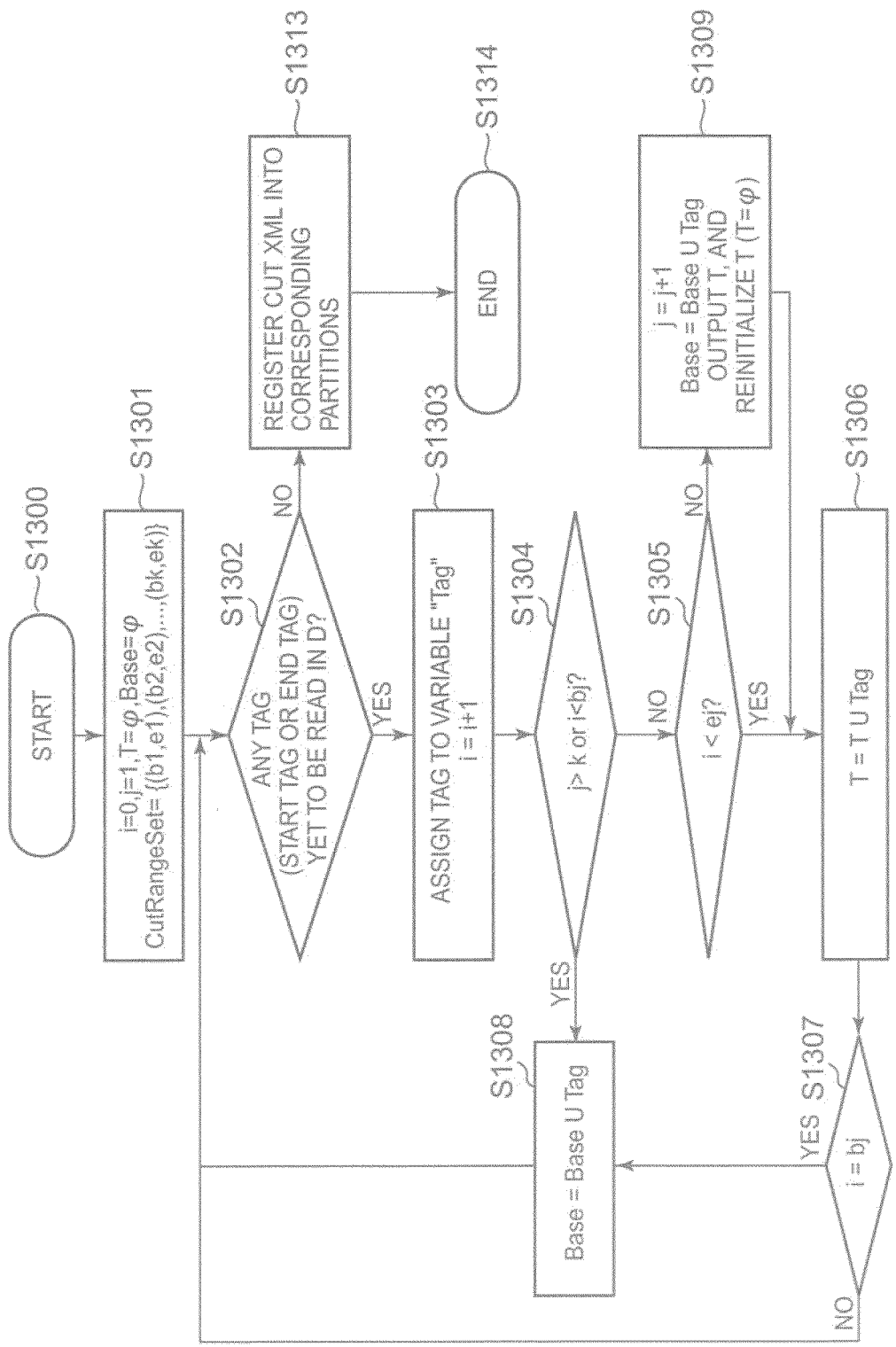

1500

1510

1512
```
<branch name="A">
<address> Shibuya, Tokyo </address>
<order slip number="0001">
<date> 2006/12/06 </date>
<client code> 0001 </client code>
<details line="1">
<product code> 010001 </product code>
<quantity> 10 </quantity>
</details>
<details line="2">
<product code> 010002 </product code>
<quantity> 1 </quantity>
</details>
</order slip>
```
1514
```
<order slip number="0002">
<date> 2007/05/04 </date>
<client code> 0001 </client code>
<details line="1">
<product code> 010003 </product code>
<quantity> 2 </quantity>
</details>
</order slip>
</branch>
```

1530
```
<branch name="A">
<address> Shibuya, Tokyo </address>
<index to order slip 0001>
<index to order slip 0002>
</branch>
```

1532
```
<order slip number="0001">
<date> 2006/12/06 </date>
<client code> 0001 </client code>
<details line="1">
<product code> 010001 </product code>
<quantity> 10 </quantity>
</details>
<details line="2">
<product code> 010002 </product code>
<quantity> 1 </quantity>
</details>
</order slip>
```

1534
```
<order slip number="0002">
<date> 2007/05/04 </date>
<client code> 0001 </client code>
<details line="1">
<product code> 010003 </product code>
<quantity> 2 </quantity>
</details>
</order slip>
```

FIG. 15

DATABASE ACCESS USING PARTITIONED DATA AREAS

CROSS-REFERENCE TO RELATED APPLICATIONS

This Application claims the benefit of, and priority to, co-pending Japanese Patent Application Number 2008-305698, filed on Nov. 28, 2008, and entitled "INFORMATION PROCESSING APPARATUS, DATABASE SYSTEM, INFORMATION PROCESSING METHOD, AND PROGRAM", the entirety of which is incorporated herein by reference for all purposes.

FIELD OF THE INVENTION

The present invention relates to information processing techniques intended for databases, and more particularly to database access techniques using partitioned data areas.

BACKGROUND OF THE INVENTION

With the spread of network infrastructure, including the Internet, and with the advancement of information processing apparatuses and application programs, the types and amount of the contents that the information processing apparatuses are able to process have considerably increased. For access to the enormous amount of contents, a database, such as a relational database or an object-orientated database, has been used to enable search of the contents by a client computer (hereinafter, simply referred to as "client").

SUMMARY OF THE INVENTION

According to one embodiment of the present disclosure, an information processing apparatus includes a database. The database includes a structured document having a hierarchical structure. A partition generating unit generates a value partition, the value partition has a unit subtree, the unit subtree has target data to be partitioned in the structured document separated and registered according to a value of the target data, and generates a base partition which includes a second subtree distinct from the unit subtree and an index for uniquely identifying the unit subtree. A parser unit identifies positions of a start tag and an end tag, the start tag and the end tag defining an attribute in the structured document to generate a cutting position list corresponding to a hierarchical structure of an attribute value and register the cutting position list in a storage area. A cutting unit separates the unit subtree and the index for referring to the unit subtree from the structured document by referring to the cutting position list to identify the start tag position and the end tag position of the unit subtree to be cut, the unit subtree includes the target data. A registration unit registers the unit subtree and the index for identifying the unit subtree, separated by the cutting unit, in the value and base partitions.

According to another embodiment of the present disclosure a database system includes a database in which a structured document having a hierarchical structure is registered. The database system includes a data management unit which generates and manages a value partition in which a unit subtree including target data to be partitioned in the structured document is separated and registered according to a value of the target data, and a base partition which includes a subtree other than the unit subtree and an index for uniquely identifying the unit subtree. The database system further includes an SQL processing unit which processes a search request for searching the structured document registered in the database, the search request designating the hierarchical structure of the structured document. In addition, the database system includes a search result generating unit which generates a search result with respect to the search request by using a result of individual search performed on the value partition by the SQL processing unit. The data management unit includes a partition generating unit which generates the partitions and a parser unit which identifies positions of a start tag and an end tag defining an attribute in the structured document to generate a cutting position list corresponding to a hierarchical structure of an attribute value and register the cutting position list in a storage area. The data management unit further includes a cutting unit which separates the unit subtree and the index for referring to the unit subtree from the structured document by referring to the cutting position list to identify the start tag position and the end tag position of the unit subtree to be cut, the unit subtree including the target data and a registration unit which registers the unit subtree and the index for identifying the unit subtree, separated by the cutting unit, in the separate partitions.

According to a further embodiment of the present disclosure, a method has a database and the database includes a structured document. Target data is separated into partitioned data based on a value associated with the target data a value partition is generated having a unit subtree, the unit subtree having the partitioned data therein. A base partition is generated, the base partition having a first subtree distinct from the unit subtree and an index associated with the unit subtree and positions of a start tag and an end tag associated with an attribute in the structured document are identified, where the attribute has a hierarchical structure. A cutting position list is generated corresponding to the hierarchical structure based on the start tag and the end tag and the cutting position list is stored in a storage area. The unit subtree and the index are separated from the structured document based on the cutting position list to identify the start tag position and the end tag position of the unit subtree to be cut and the unit subtree and the index are registered to identify the unit subtree, separated in the separating step, in the base and value partitions. The database is searched based on at least one of the value partition and the base partition and the results are displayed of the search.

According to yet another embodiment of the present disclosure a computer program product and a computer readable storage medium having computer readable program code embodied therewith are provided. The computer readable program code is configured to generate a value partition in which a unit subtree including target data to be partitioned in the structured document is separated and registered according to a value of the target data, and a base partition which includes a subtree other than the unit subtree and an index for uniquely identifying the unit subtree and identify positions of a start tag and an end tag defining an attribute in the structured document to generate a cutting position list corresponding to a hierarchical structure of an attribute value and register the cutting position list in a storage area. The code is further configured to separate the unit subtree and the index for referring to the unit subtree from the structured document by referring to the cutting position list to identify the start tag position and the end tag position of the unit subtree to be cut, the unit subtree including the target data and register the unit subtree and the index for identifying the unit subtree, separated in the separating step, in the separate partitions.

In addition, according to another embodiment of the present disclosure, an information processing apparatus includes a database in which a structured document having a hierarchical structure is managed. A partition generating unit generates a value partition in which a unit subtree including target data to be partitioned in the structured document is separated and registered according to a value of the target data, and a base partition which includes a subtree other than the unit subtree and an index for uniquely identifying the unit subtree. A parser unit identifies positions of a start tag and an end tag defining an attribute in the structured document to generate a cutting position list corresponding to a hierarchical structure of an attribute value and registers the cutting position list in a storage area. A cutting unit separates the unit subtree and the index for referring to the unit subtree from the structured document by referring to the cutting position list to identify the start tag position and the end tag position of the unit subtree to be cut, where the unit subtree includes the target data. A registration unit registers the unit subtree and the index for identifying the unit subtree, separated by the cutting unit, in the separate partitions. The unit subtree includes a plurality of start tags, and the index is generated from a first one of the start tags in the unit subtree. The registration unit adds pointers to the unit subtree and the index for uniquely identifying the unit subtree to allow cross-reference between the unit subtree and the index, before registering the unit subtree and the index in the separate partitions. In order to separate the unit subtree for registration in the separate partition by referring to the cutting position list, the cutting unit generates a subtree data list and registers the generated list in a storage area, the subtree data list including a range-defining pair in which a start position and an end position of the unit subtree included in the structured document are associated with each other and an occurrence counter in which the order of description of the unit subtree in the structured document is registered. The structured document is described in XML, and the database is an XMLDB which enables storage and search of XML documents.

BRIEF DESCRIPTION OF THE DRAWINGS

FIG. 3 shows an embodiment of an XML document 300 to be processed by the server 130 of the present embodiment.

FIG. 6 shows an embodiment of a DDL statement 600 which is used by the server 130 of the present embodiment to perform processing of generating partitions in step S501 in FIG. 5.

FIG. 12 shows an embodiment of a subtree data list for use in XML cutting, which is generated in the processing shown in FIGS. 9 to 11.

FIG. 13 is a flowchart illustrating the processing of generating a subtree to be registered in a base partition.

FIG. 15 shows an XML document being partitioned according to the present embodiment, and an embodiment of registration processing in the base partition and in the value partitions.

DETAILED DESCRIPTION OF THE INVENTION

A database manages content by uniquely identifying content using a master key or the like. Conventionally, an index generated from keywords included in the content is used for searching, and the content, or a list of the content that have been found by the search, are returned to the client to provide the content to a user of the client. If the amount of content managed by the database is not enormous, keyword searches and the like may be performed on the full text managed by the database with little adverse effect on the search efficiency.

The amount of content to be searched by databases has become enormous, and recently, full-text indexing is increasingly used for searching. In order to improve the search efficiency, one approach is to assign partitions to the content in the database and perform a search within a specific partition, rather than over the entire database, to thereby reduce the search space.

For partitioning, a table may be divided into ranges based on a target item to be partitioned, such as a year or month, to store data falling within the same range in a same partition. Then, content or data may be added, deleted, or searched on a partition basis. Such a search on a partition basis generally provides faster processing than in the case of searching over all the content or data registered.

Further, there is a technique of registering the contents or data in the relational database in the form of a structured document, such as an XML document. By introducing a structured document like the XML document when registering various data into the relational database, a search using an XML parser such as a DOM (Document Object Model) or SAX (Simple API for XML) becomes available in addition to the conventional index search, and an XML database (hereinafter, referred to as "XMLDB") is possible as well, and may enable a more efficient content search. Furthermore, the XMLDB can be used to modify the registered elements of contents or data, without modifying the schema of the relational database, thereby providing more flexibility in supporting changes to the schema.

Figure 17:
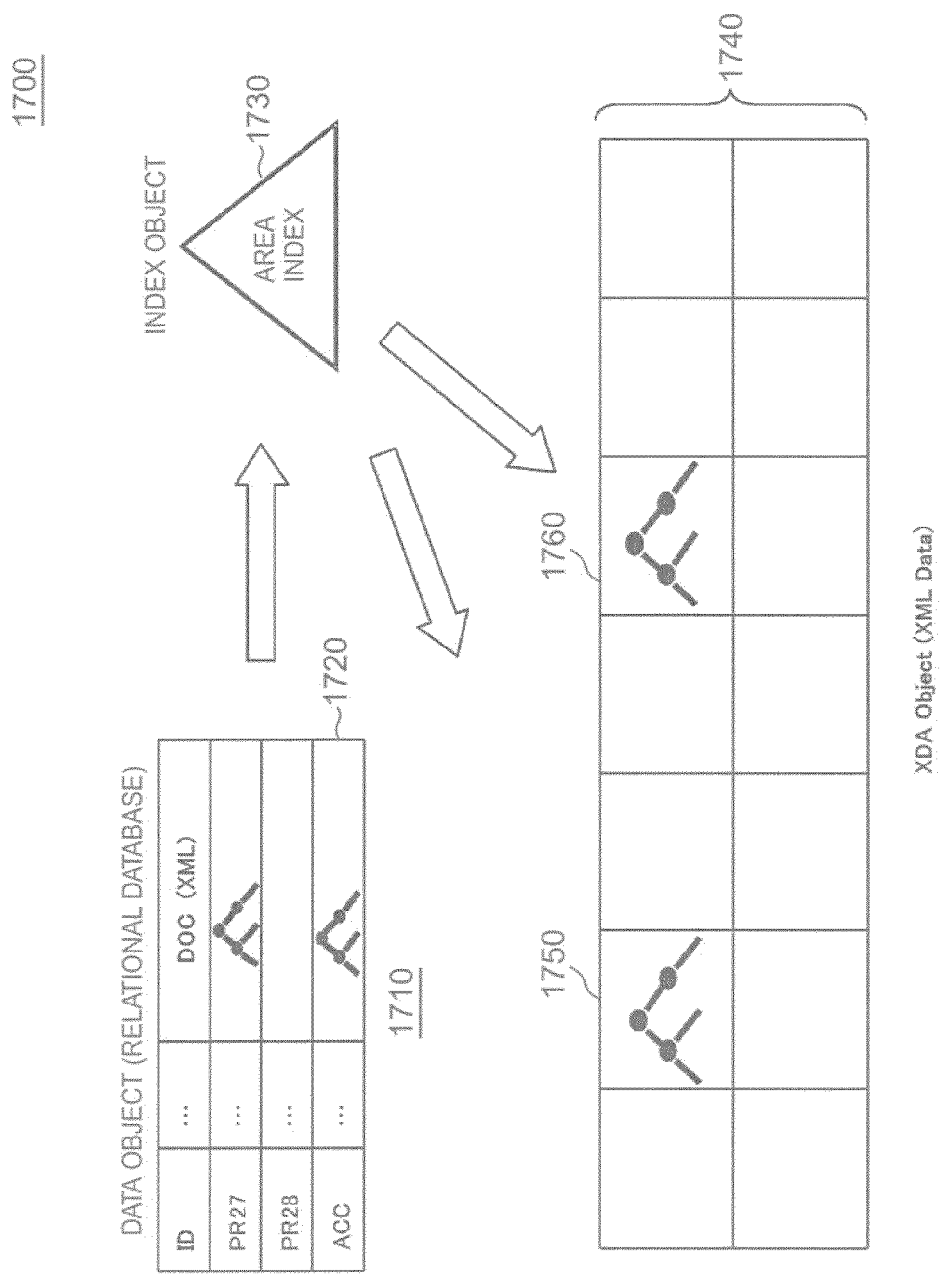
FIG. 17 shows a data storage structure in a conventional XMLDB.

FIG. 17 shows an example of conventional structure of records or columns in the case where an XML document is managed in a relational database (hereinafter, referred to as "RDB"). To support the XML document in the RDB, the XML data would normally be mapped to and stored in a column in the RDB, or stored and managed in a column as text data.

In the example shown in FIG. 17, the relational database 1710 has a column for registering an ID (identification) value for identification of a prescribed record, one or more columns for registering other attribute values, and a column 1720 for registering a text of the XML document. If the XML document is small in size, the XML document may be registered in the column 1720 with no problem. However, the size of the XML document describing data of one category tends to increase, and may become very large, such as several gigabytes in size. In such a case, searching the entire XML document is inefficient, even allowing for the processing performed by the XML parser and others.

Various techniques for efficiently searching a large-sized XML document may be used. For example, in a relational database product DB2® (DB2 is a registered trademark of International Business Machines Corporation), an XDA (XML Data Area) object 1740 is generated for storing and searching an XML document. The XDA object 1740 is divided into a plurality of areas 1750 and 1760, and an index object 1730 is configured to index specific areas in the XML document, to enable accesses to the divided areas of the large-sized XML document. Further, the XML document has its entirety or its subtrees each extended as a node table, and the node table may be used as an index object as well.

As described above, there are various techniques for assigning partitions to a database to improve search efficiency for the content or data stored in the database, and for registering a structured document describing a hierarchical structure in the database for the purposes of improving efficiency in management of the database.

In the case where an XML document is managed by the RDB, the entire data may be categorized, or partitioned, into specific value ranges according to date, place of business, or details, for example, besides the division of the XML document into areas in association with the tree structure as shown in FIG. 17. When the XML document is partitioned according to a specific attribute value, the search may be performed on only the data including the specific attribute value. This allows the search space to be reduced, enabling efficient search processing.

However, the technique of reducing the search space by assigning partitions to the database does not necessarily provide an efficient partitioning method if the technique is applied to the XMLDB as is. Specifically, the XML document may have a hierarchical data structure by itself. Thus, it is fairly conceivable that a subtree having the target data based on which partitioning is carried out may be added to the XML document. Further, it is likely that in the subtrees designated by the same attribute value in the data managed by the XMLDB, for example, in the subtrees designated by <branch name=" ">, subtrees which have the target data to be partitioned and are to be separated into different partitions may be added.

Accordingly, when performing partitioning in the XMLDB, it is preferrable to specify the subtrees which include the target data to be partitioned, such as date, product name, customer, place of business, or the like, and to compare the target data with the partition ranges for only the specified subtrees.

Furthermore, simply cutting the XML document into partitions may lead to a loss of hierarchical structure of the XML document, in which case it would be necessary to create new index data, because it is no longer possible to effectively use the hierarchical structure for the search.

One embodiment of the present invention provides an information processing apparatus in which a unit subtree including target data to be partitioned in a structured document is identified in the structured document as a range-defining pair in which a start tag and an end tag defining the unit subtree are associated with each other. At the same time, the information processing apparatus generates an occurrence counter indicating the order of description of the unit subtree in the structured document for identification of the position of the subtree in the structured document. While the following description will use an XMLDB which uses a relational database as a database for storing target data, the present invention is not restricted to an XMLDB which uses a relational database.

The unit subtree has a hierarchical structure including a text having a specific meaning according to which partitioning is carried out. The unit subtree is defined in units of tags defining an attribute having a specific meaning. A database administrator or a user accessing the database can define the unit subtree using an XPath or the like. In partitioning, the information processing apparatus generates a value partition for registering the unit subtree, and a base partition for registering an index for referring to the unit subtree.

Thereafter, the information processing apparatus starts a parser unit to identify positions of the start tag and the end tag defining an attribute value to generate a cutting position list corresponding to the hierarchical structure of the attribute value, and registers the cutting position list in a storage area. Further, when a unit subtree of the structured document is recognized by referring to the generated cutting position list, the information processing apparatus generates a range-defining pair by associating a line position in the structured document at which the unit subtree starts with a line position in the structured document at which the unit subtree ends. The range-defining pair is associated with the occurrence position in the structured document by an occurrence counter, whereby a subtree data list is generated.

When the subtree data list is generated, the information processing apparatus refers to the cutting position list to identify the start tag position and the end tag position of the unit subtree to be cut, the unit subtree including the target data to be partitioned. The information processing apparatus then separates and identifies the unit subtree and the index for referring to the unit subtree from the structured document, and registers the separated unit subtree and the index for identifying the unit subtree in the separate partitions, to thereby complete partitioning.

The unit subtree includes a plurality of start tags, and the index is generated from a first one of the start tags in the corresponding unit subtree. Before registration into partitions, pointers are added to the unit subtree and the index for uniquely identifying the unit subtree, to enable cross-reference there-between.

Further, the information processing apparatus of one embodiment of the present invention may include an SQL processing unit for performing search of a unit subtree registered in the value partition by using the target data, and a search result generating unit for generating a result of the search performed by the SQL processing unit. The structured document may be described in XML, and the database may be an XMLDB which uses a relational database.

Figure 1:
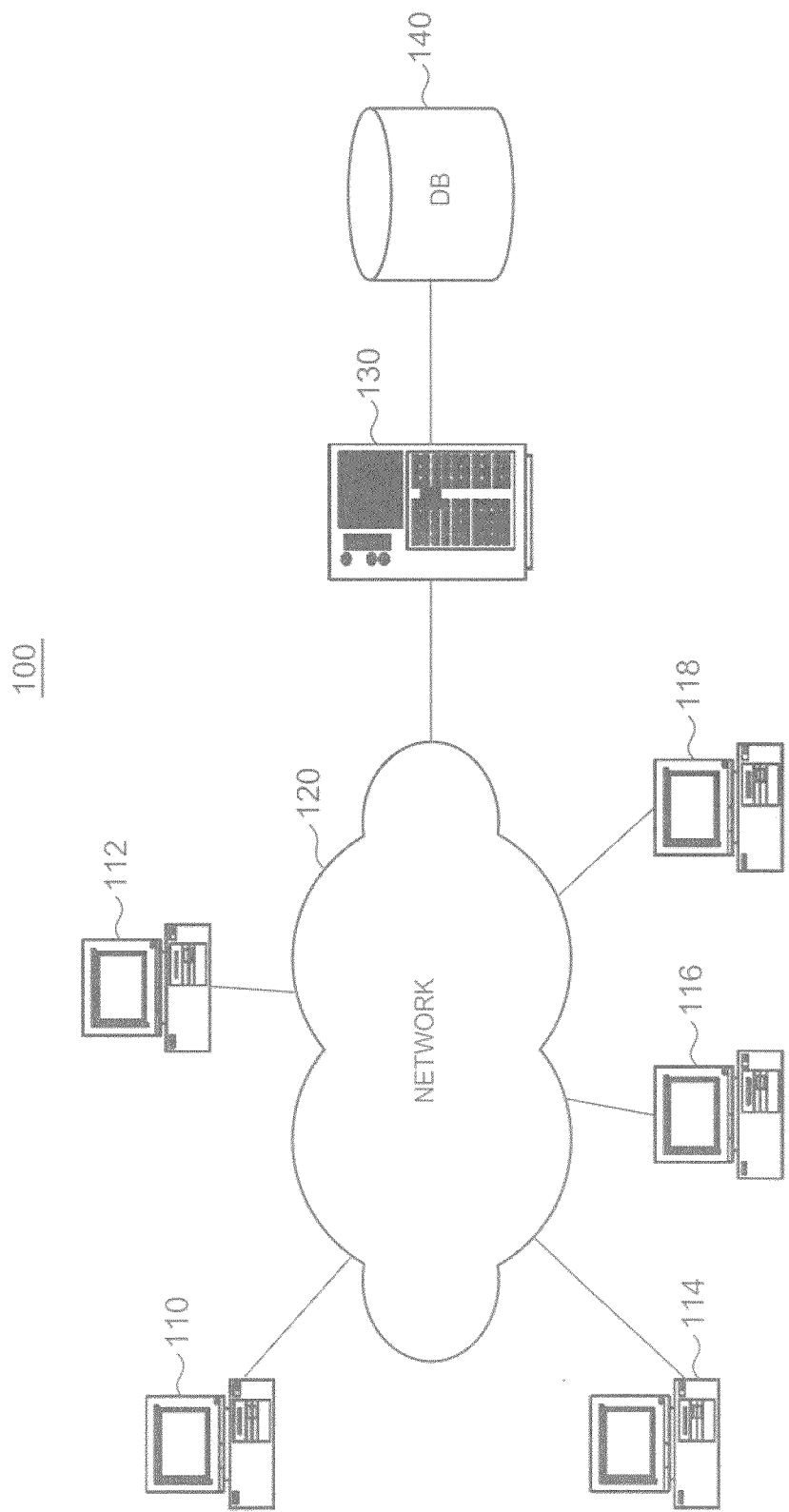
FIG. 1 shows a database system 100 according to an embodiment of the present disclosure.

While the present invention will now be described with reference to one or more embodiments, the present invention is not limited to the following embodiments. FIG. 1 shows a database system 100 according to one embodiment. The database system 100 includes a server 130, a database 140, a network 120, and a plurality of clients 110, 112, 114, 116, and 118, wherein each client is connected to the network 120 and operated by a user to access the server 130 via the network 120.

The server 130 functions as an information processing apparatus that implements a database application in which data is partitioned and stored using a structured document such as an XML document. The server 130 may be implemented with the functions of web server, SMS server, and mail server, in addition to the database server, although the functions thereof are not restricted. The network 120 preferably includes the Internet, although it may include a WAN (Wide Area Network), a LAN (Local Area Network), or other networking systems and/or technologies besides the Internet.

The server 130 may implement a CISC architecture microprocessor, such as Pentium® or Pentium®-compatible chip, or a RISC architecture microprocessor, such as PowerPC®, in the single-core or multi-core form. Further, the server 130 may be controlled by an operating system such as Windows® 200X, UNIX®, or Linux®. The server 130 executes a server program such as CGI, servlet, or Apache, which may be implemented in a programming language such as C, C++, Java™, JavaBeans™, Perl, or Ruby, to process various requests transmitted from the clients 110 to 118, which may include a data registration request and a search request.

The clients 110 to 118 may each be implemented with a personal computer or a workstation, and its microprocessor unit (MPU) may include any suitable single-core processors and/or multi-core processors of any suitable technology, such as CISC or RISC. The clients 110 to 118 may each be controlled by any operating system, such as Windows®, UNIX®, Linux®, or Mac OS®. Further, the clients 110 to 118 may each implement browser software such as Internet Explorer®, Mozilla®, Opera®, or Netscape Navigator®, for accessing the server 130.

Each of the clients 110 to 118 is connected with the server 130 via the network that supports transaction using a file transfer protocol such as the HTTP protocol over a protocol such as TCP/IP. Each of the clients 110 to 118 may implement JDBC (Java™ Database Connectivity) and may be connected with the server 130 using the application-level protocol determined by JDBC, for accessing the database application in the server 130.

In response to a request transmitted from one of the clients 110 to 118, the server 130 processes the database managed by the server 130 in accordance with the request. For example, it may store received data in the database 140 and partition the data in accordance with a specific attribute value for registration. In the case where the request received from one of the clients 110 to 118 is a search request, the server 130 issues an SQL (Structured Query Language) statement to the database 140. In one embodiment, in the case where the search request includes an attribute related to partitioning, the server 130 performs a search across the data which is registered as a structured document, such as an XML document, on a partition basis.

Further, in the case where the search request does not include the attribute related to partitioning, the server 130 performs a conventional search using an SQL statement. While an XML document is employed by way of example as the structured document, the structured document is not particularly restricted to the XML document, and may be a document in SGML, XHTML, or Enhanced XML.

For the database application, it is possible to adopt a so-called relational database (RDB) such as DB2® (DB2 is a registered trademark of International Business Machines Corporation), Oracle®, MySQL, or Access®. In the database application of the database system 100, a partition module may be additionally implemented as an extension for partitioning of the database.

Figure 2:
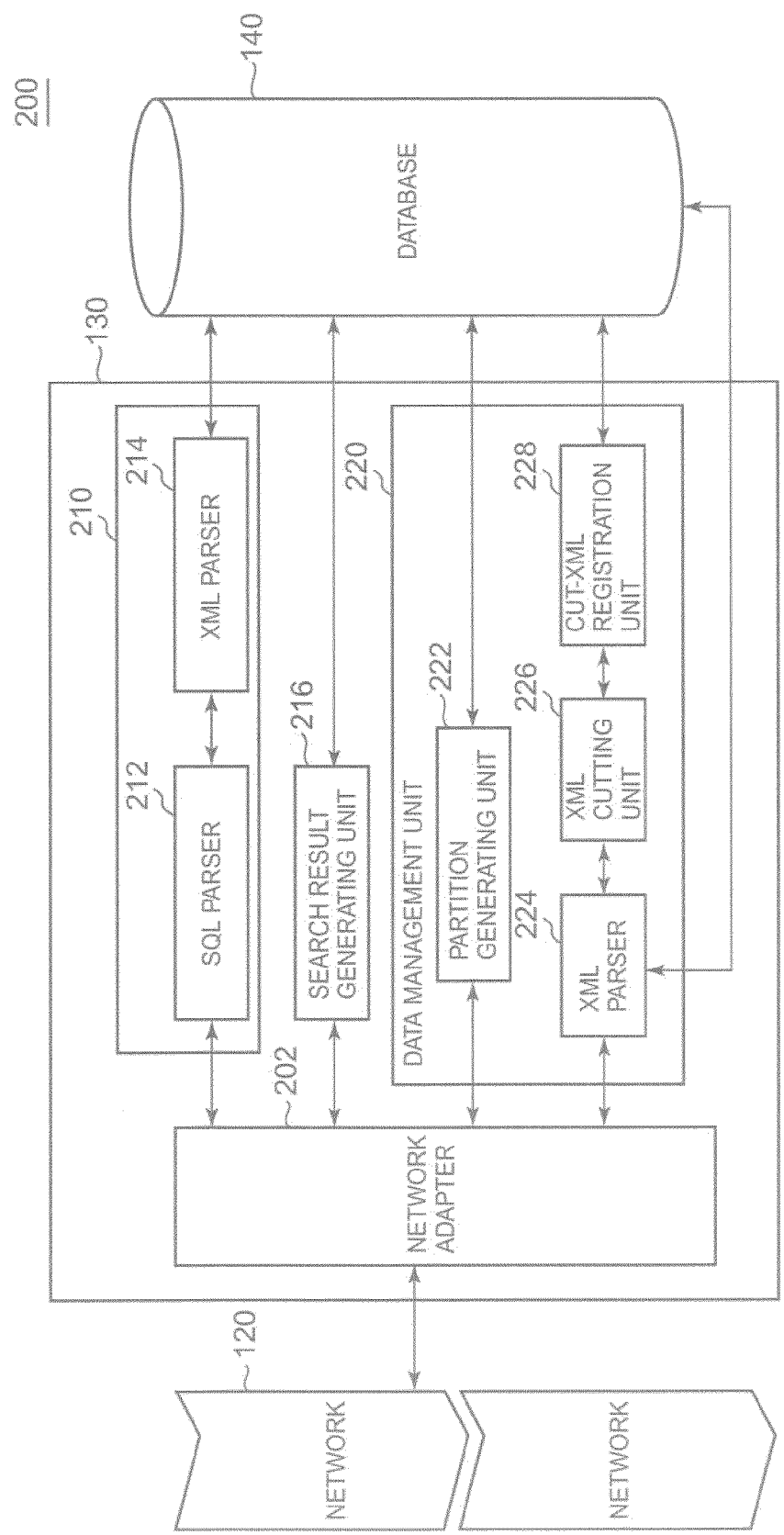
FIG. 2 is a functional block diagram 200 of a server 130 of the present embodiment.

FIG. 2 is a functional block diagram 200 of the server 130 according to one embodiment. Each functional block shown in FIG. 2 is implemented on the information processing apparatus by a processor in the server 130 reading a program for implementing the functional unit into a work area such as a RAM and executes the program to realize the functional means of the information processing apparatus. The server 130 receives requests from the clients 110 to 118 via the network 120. Each request is received by a network adapter 202, and passed via a physical layer, a data link layer, a network layer, a transport layer, etc. to an upper application layer in the OSI reference model. The request and data are then passed via the application layer to the database application.

For execution of the processing, the server 130 includes an SQL processing unit 210, a search result generating unit 216, and a data management unit 220. The SQL processing unit 210 processes an SQL command which enables a search designating a hierarchical structure of an XML document, and generates a search result. In the embodiment shown in FIG. 2, the SQL processing unit 210 includes an SQL parser 212 and an XML parser 214. The SQL parser 212 analyzes the SQL command corresponding to the received search request, to enable a search by the XML parser 214 which is implemented with a SAX or the like included therein.

The search result generating unit 216 acquires a result extracted from the database 140 by the XML parser 214, generates an appropriate format, e.g., an XML document or a table, for displaying the result as a value partition search result, and returns it to the client via the network adapter 202.

The server 130 further includes the data management unit 220, as described above. The data management unit 220 may be implemented as an enhancement module for the database application, and may include a partition generating unit 222, an XML parser 224, an XML cutting unit 226, and a cut-XML registration unit 228. The partition generating unit 222 generates partitions using ranges that are set for target data based on which a database administrator sets the partitions for management of the database 140, wherein the target data may be date, customer name, product name, place of business, department, or the like.

Further, in the case where the database 140 is the one accessible for generating data in a private level, such as MySQL or Access, the user may issue, e.g., a "partition generation" request to generate partitions based on the target data for the data to be managed by the user, and the server 130 that received the request may generate the partitions as requested.

It is noted that the partition generation request issued by the database administrator or the user may include a description of a subtree of the XML document to be partitioned, for defining the granularity of partitioning. Hereinafter, a subtree for defining the granularity of partitioning will be referred to as "unit subtree=P". The unit subtree may be defined, e.g., as P=*/a/b/c . . . , where "*" is a wild card, and "a", "b", and "c" each correspond to a tag having an attribute and an attribute value defined in the unit subtree.

Further, the XML parser 224 serves as a parser unit which performs parsing of the structured document to be partitioned, and also serves as a preprocessor which obtains the XML document to be processed, from one of the clients 110 to 118 or from the database 140, and cuts the unit subtrees in the XML document according to the partitions. To this end, the XML parser 224 identifies a line position including a tag which defines the attribute of a node in the XML document to generate a cutting position list, and stores the generated list in an appropriate storage area such as a RAM. The XML parser 224 may also be implemented with a DOM or a SAX included therein. While the XML parser 224 and the XML parser 214 are illustrated as separate functional units because of differences in their functions, in a software configuration, a single XML parser may be used to function as both parsers.

The data management unit 220 further includes the XML cutting unit 226 and the cut-XML registration unit 228, as described above. The XML cutting unit 226 uses the cutting position list of the XML document to be processed, which was obtained by the XML parser 224, to cut the XML document into partitions with the granularity of unit subtrees. Further, for the purpose of registering the information that designates the hierarchical structure in the original XML document of the partitioned unit subtree of the XML document, the XML cutting unit 226 generates an index for identification of the unit subtree, and separates it from the XML document and from the unit subtree.

Hereinafter, a partition categorized in accordance with the target data such as a date will be referred to as "value partition", while a partition for registering an index which associates the unit subtree registered in a value partition with the original XML document will be referred to as "base partition". In the case where the XML document includes a subtree which is not to be partitioned, such a subtree is also registered in the base partition.

The cut-XML registration unit 228 uses the results of cutting performed by the XML cutting unit 226, to register the unit subtrees and the indices in the corresponding partitions. In order to enable cross-reference of the hierarchical structure of the partitioned unit subtree with the hierarchical level in the original XML document, the cut-XML registration unit 228 adds unique cross-reference identification values to the index to be registered in the base partition and the unit subtree to be partitioned, respectively. The cross-reference identification values will be described later in detail.

FIG. 3 shows an embodiment of an XML document 300 to be processed by the server 130 of the present embodiment. The XML document 300 shown in FIG. 3 is sales order data in a certain company. It includes, for each branch, branch information, sales order identification value, customer information, and sales order content, which are described in an XML document having a hierarchical structure identified by tags. In the XML document 300, a parent node specified by <branch name="A"> includes a plurality of child nodes each specified by an <order slip> tag. In the illustrative embodiment shown in FIG. 3, the parent node which is declared to have the <branch name "A"> attribute includes child nodes 310 and 320.

It is noted that the embodiment shown in FIG. 3 is only illustrative. The parent node <branch name="A"> may have a larger number of child nodes, and the XML document to be processed may include data of tens of thousands of lines. As shown in FIG. 3, each child node includes a <date> tag. These tags describing the target data are "data tags", while the tags defining the attributes are referred to as "attribute definition tags". In the illustrated embodiment, it is assumed that the target data to be partitioned are dates, and ranges such as fiscal years are assigned as the dates for partitioning into value partitions. The attribute definition tags correspond to <branch name="A">, <order slip number="0001">, <details line="1">, and others. The partitioning ranges may be, besides the fiscal years or publication years, geographical ranges such as U.S.A., Japan, China, and others, or may be character ranges such as "a to d", "e to f", and others.

Figure 4:
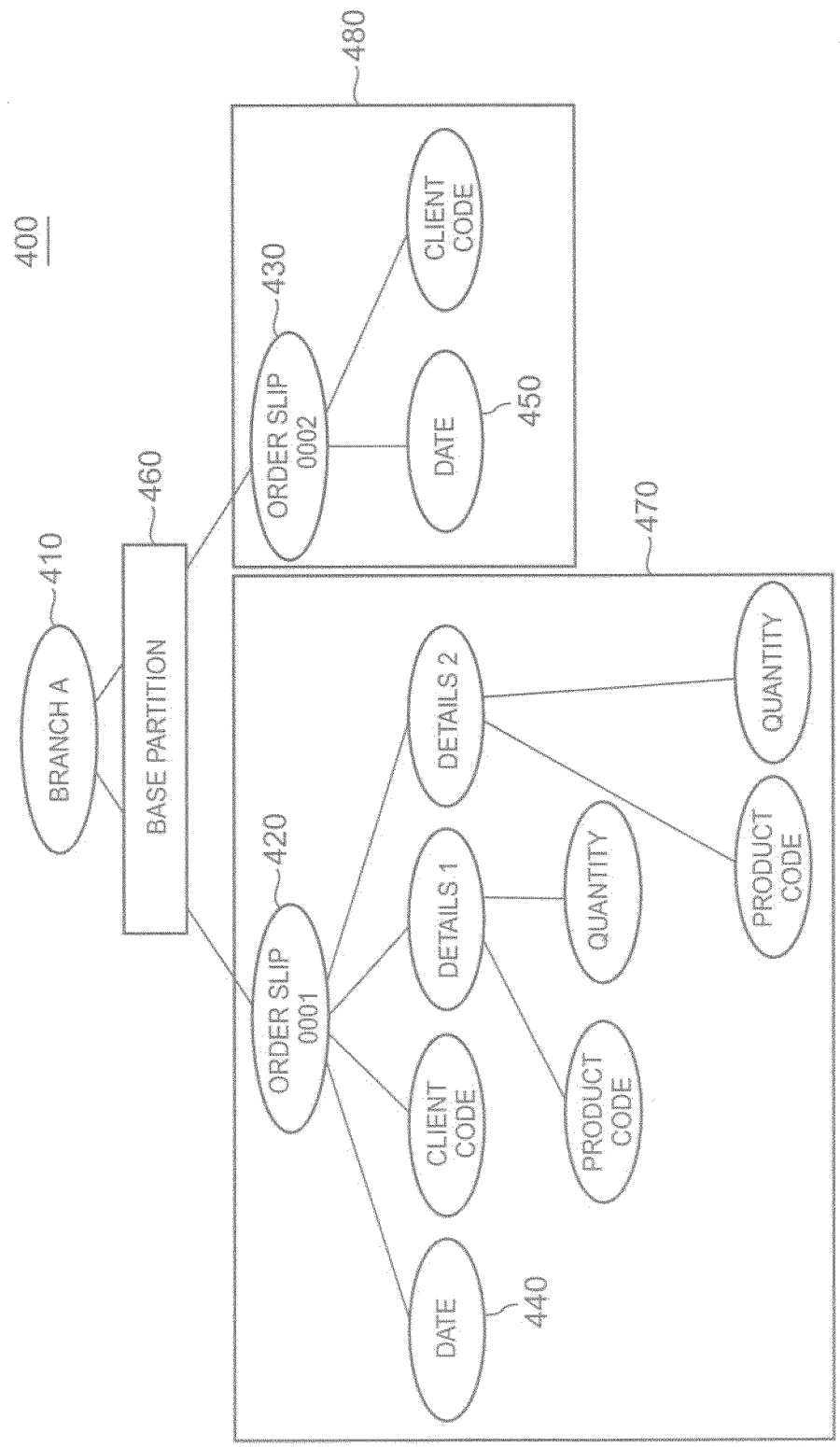
FIG. 4 shows the XML document 300 of the present embodiment in the form of a tree structure 400.

FIG. 4 shows the XML document 300 of one embodiment as a tree or hierarchical structure 400. As shown in FIG. 4, the hierarchical structure 400 has <branch A> as a parent node 410, and <order slip 0001> and <order slip 0002> as child nodes 420 and 430, respectively, of the branch A node 410. In the case where the date data are to be partitioned, as shown in FIG. 3, the child nodes 420 and 430 fall into partitions 470 and 480, respectively, of the different fiscal years.

In the case where there are a plurality of child nodes including the target data to be partitioned, as shown in FIG. 4, the target data generally have different values for the different child nodes. Thus, it is necessary to cut the to-be-partitioned child nodes from the hierarchical structure to register them into different value partitions. With the processing of merely detecting the target data in the unit subtrees to group them into partitions, as performed in the conventional relational database, the hierarchical structure of the original XML document would be lost and, hence, the effectiveness of the XMLDB would be damaged. Thus XPaths are designated in the XML document 300 of the child nodes included in the value partitions 470 and 480.

For the subtrees describing the child nodes partitioned into the value partitions 470 and 480 from the XML document 300, a base partition 460 for specifying the hierarchical structure of the original XML document is generated, to improve the search efficiency by the partitioning, while maintaining the effectiveness of the XMLDB. The base partition 460 allows the levels of the child nodes in the hierarchical structure in the original XML document to be maintained, thereby enabling reference to the unit subtree corresponding to a specific child node.

Figure 5:
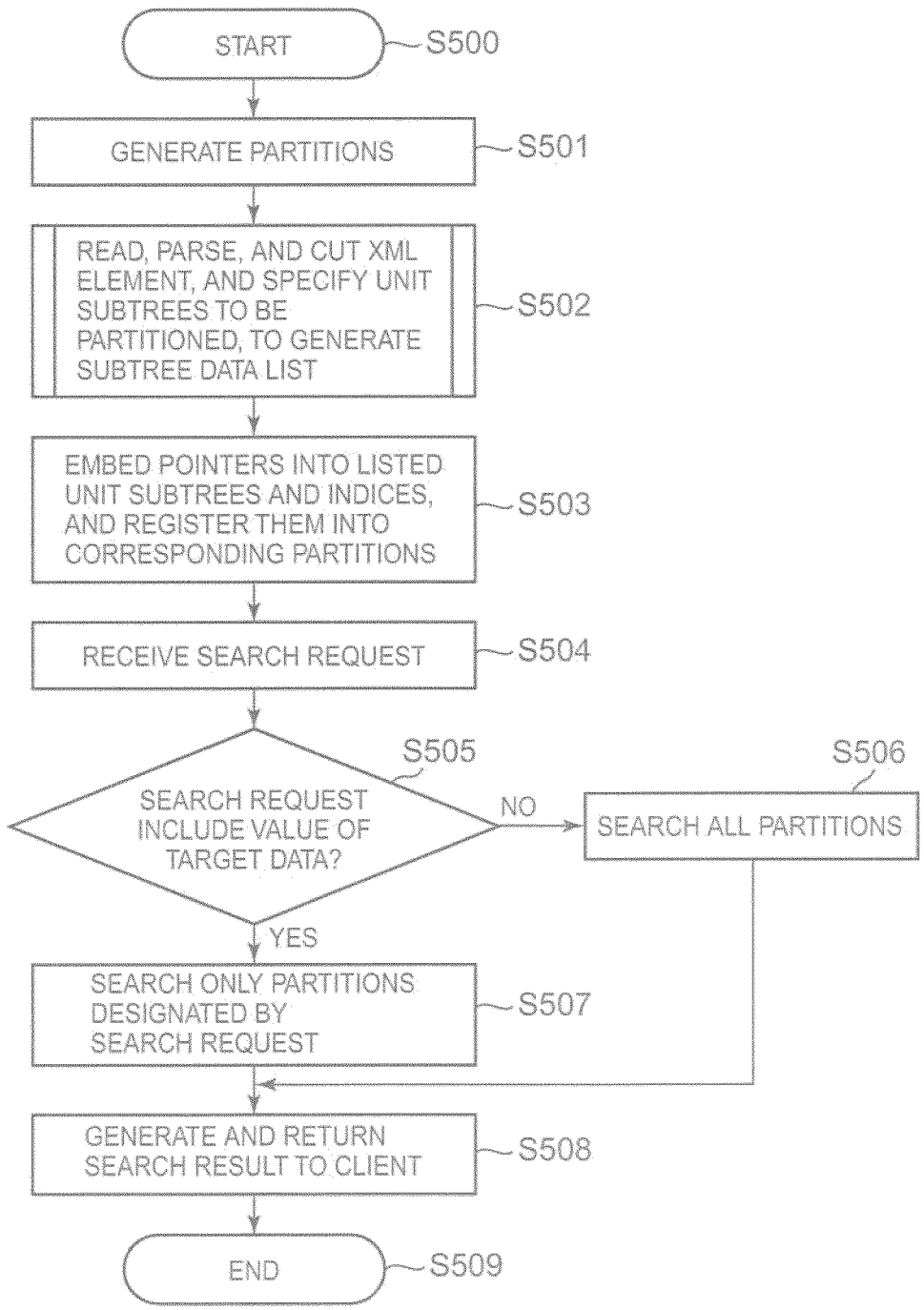
FIG. 5 is a flowchart schematically illustrating the processing performed on an XMLDB by the server 130 of the present embodiment.

FIG. 5 is a flowchart schematically illustrating the processing performed on an XMLDB by the server 130 of the present embodiment. The processing in FIG. 5 starts in step S500 when a partition request command is received from a database administrator or one of the clients 110 to 118. In step S501, the server 130 generates value partitions corresponding to ranges of data specified. The partitions may be generated in step S501 using an SQL script in which DDL (Data Definition Language) for the relational database is enhanced to support the XML.

In step S502, the XML document to be processed is read and subjected to parsing. The unit subtrees are cut from the XML document, and a subtree data list is generated in which the unit subtrees to be partitioned are associated with their order of occurrence. Then, in step S503, pointers are embedded into the listed unit subtrees, which are in turn registered into partitions. The pointer may be embedded in a start tag of the unit subtree as a hidden attribute, for example. Alternatively, the pointer may be added to a record, in a node table used for indexing or the like, that stores a value corresponding to the subtree. The pointers and their embedding processing will be described later in more detail.

The partitioning of the XML document in the present embodiment ends in step S503. The processing in steps S501 through S503 may be performed on the XML document already stored in the relational database, or on an XML document which has been transmitted to the server 130 together with a request for new registration.

Step S504 and the following steps in FIG. 5 correspond to searching performed on the XMLDB. In step S504, the server 130 receives a search request from one of the clients 110 to 118. In step S505, it is determined whether the search request includes the target data based on which the partitions were generated. If it is determined that the search request includes the target data used for partitioning (Yes), in step S507, search is performed on only the partitions which were grouped under the target data designated by the search request, and in step S508, the search result is returned to the client that issued the search request. The process then ends in step S509.

On the other hand, if it is determined in step S505 that the search request does not include the attribute value used for partitioning (No), all the partitions are searched in step S506, and in step S508, the search result is generated by merging the results obtained for the partitions, and is returned to the client that issued the search request. The process then ends in step S509. In the case where step S506 requires not only the search of individual value partitions but also the search of the base partition, the search result may be generated in step S508 by separately merging the search results of the value partitions and the search result of the base partition.

For merging the search results after partitioning, the known way of merging the search results of the partitioned data as in the conventional relational database may be employed.

FIG. 6 shows one embodiment of a DDL statement 600 which is used by the server 130 to generate partitions in step S501 in FIG. 5. In the DDL statement 600, creation of a branch sales order management table is firstly directed by "CREATE TABLE", which is followed by specification of an ID for uniquely identifying the branch sales order management table. Further, a target attribute of the XML document is specified, and then, partitioning is directed by "PARTITION BY RANGE". With the DDL statement 600 shown in FIG. 6, it is possible to designate the XPath in the XML document as a parameter to the "PARTITION BY RANGE" command, and a depth of the XPath necessary for partitioning the read XML document according to the XPath is designated. For the child nodes starting at an <order slip> registered in the read XML document, the DDL statement 600 generates three value partitions corresponding to the following ranges: from the oldest data to 2006/12/31; from 2007/01/01 to 2007/12/31; and from 2008/01/01 to 2008/12/31.

The DDL statement 600 shown in FIG. 6 does not include an explicit command to generate a base partition. In generation of the base partition, when the XPath of the XML document for use in the range-cutting is set by (INFOXML/BRANCH/ORDER SLIP/DATE) in FIG. 6, fragments of the subtrees of the XML document to be stored in the base partition, i.e. the subtrees not included in any of the date partitions, and indices of the partitioned unit subtrees are determined according to a cutting algorithm. For registration of the base partition, the server 130 only needs to define a data storage structure in the XMLDB when the parameter setting for PARTITION BY RANGE (INFOXML/ . . . ) has been identified.

It is noted that the "PARTITION BY RANGE" command and the partitioning processing are described here for the case of using DB2 as the database 140 by way of example. They may of course be modified as appropriate to conform to various formats adopted for other relational databases, and an explicit command to generate a base partition may be employed according to an implementation of a specific relational database or for convenience in implementation of the XML cutting processing.

The hierarchical level of the tag to be used for partition setting directly concerns the definition of the value partitions. The tag corresponding to the depth of (INFOXML/BRANCH/ORDER SLIP/DATE) which has been set as the parameter to the DDL statement 600, specifically the <date> tag, may be designated for the partition setting. While the depth of the XPath defined by the DDL statement may be described explicitly as a value tag, it may also be described implicitly using a wild card such as "*", as long as it matches the depth and the hierarchical structure in the XPath.

Figure 7:
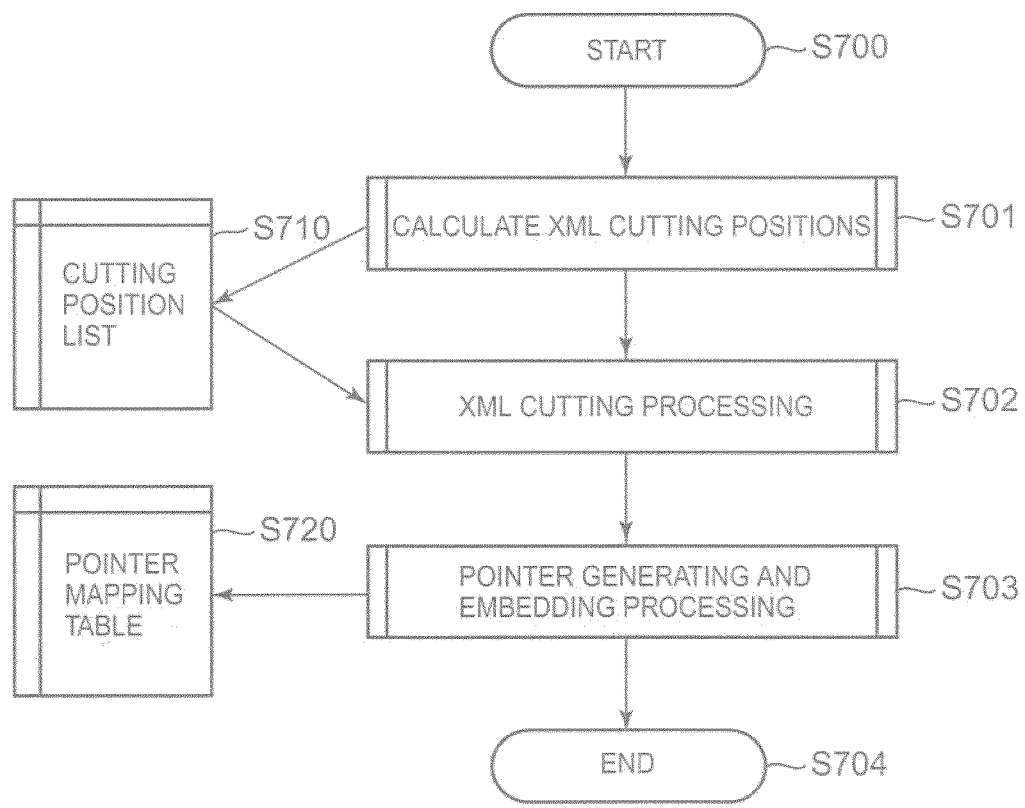
FIG. 7 is a more detailed flowchart of step S502 in FIG. 5, in which XML cutting processing of the present embodiment is performed.

FIG. 7 is a more detailed flowchart of the XML cutting processing of the present embodiment which is performed in step S502 in FIG. 5. The processing in FIG. 7 starts in step S700 when the control is passed from step S501 in FIG. 5. In step S701, the XML cutting positions are calculated by calling an XML parser. According to the processing in step S701, which will be described later in more detail, the XML parser 224 reads the XML document and calculates cutting positions for identification of the child nodes for partitioning, to thereby generate a cutting position list designating the cutting positions. The cutting position list 710 generated is stored in an appropriate storage area such as a RAM and held by the server 130 until the partitioning processing is completed.

In step S702, with reference to the cutting position list 710, unit subtrees each having the target data to be partitioned are cut from the child nodes constituting the XML document, and pairs of values defining ranges (hereinafter, referred to as the "range-defining pairs") for identification of the unit subtrees and occurrence counters are generated, whereby the generation of a subtree data list, cutting of the unit subtrees, and generation of indices are carried out. Thereafter, in step S703, pointers to be embedded in the tags including the target values to be partitioned in the obtained unit subtrees and pointers to be embedded in the indices to be registered in the base partition are generated. The pointers generated may have values with which the indices are uniquely associated with the corresponding unit subtrees in the database 140.

To this end, for example, an index pointer for uniquely identifying an index may be embedded in the unit subtree, and a child node pointer for uniquely identifying a unit subtree may be embedded in the index. As the index pointer, the registration number or the storage address of the index in the base partition may be used. Similarly, as the child node pointer, the registration number or the storage address of the unit subtree in the value partition may be used.

For the embedding of the pointers in step S703, every time the unit subtree and the index are generated in the XML cutting processing in step S702, the registration number or the to-be-stored address may be assigned thereto, and a pointer mapping table 720 may be generated in which the pointers are associated therewith. This allows parallel registration of the index and the unit subtree in the base partition and the value partition, respectively, with reference to the pointer mapping table 720.

Alternatively, once the unit subtree to be registered in the value partition is specified, the pointer mapping table 720 may be formed as a list in which the latest pointers to be registered in the index are associated with the unit subtree. While the pointer mapping table 720 may be deleted from the memory upon completion of the pointer embedding processing, in order for use as index data for searching, it may be cached during the processing period, in association with the ID in FIG. 6, as an index of the table created according to the "CREATE TABLE" command.

When the pointer generating and embedding processing is completed, the process proceeds to step S704, where the control is passed to step S503 in FIG. 5, whereby the processing in FIG. 7 is terminated.

Figure 8:
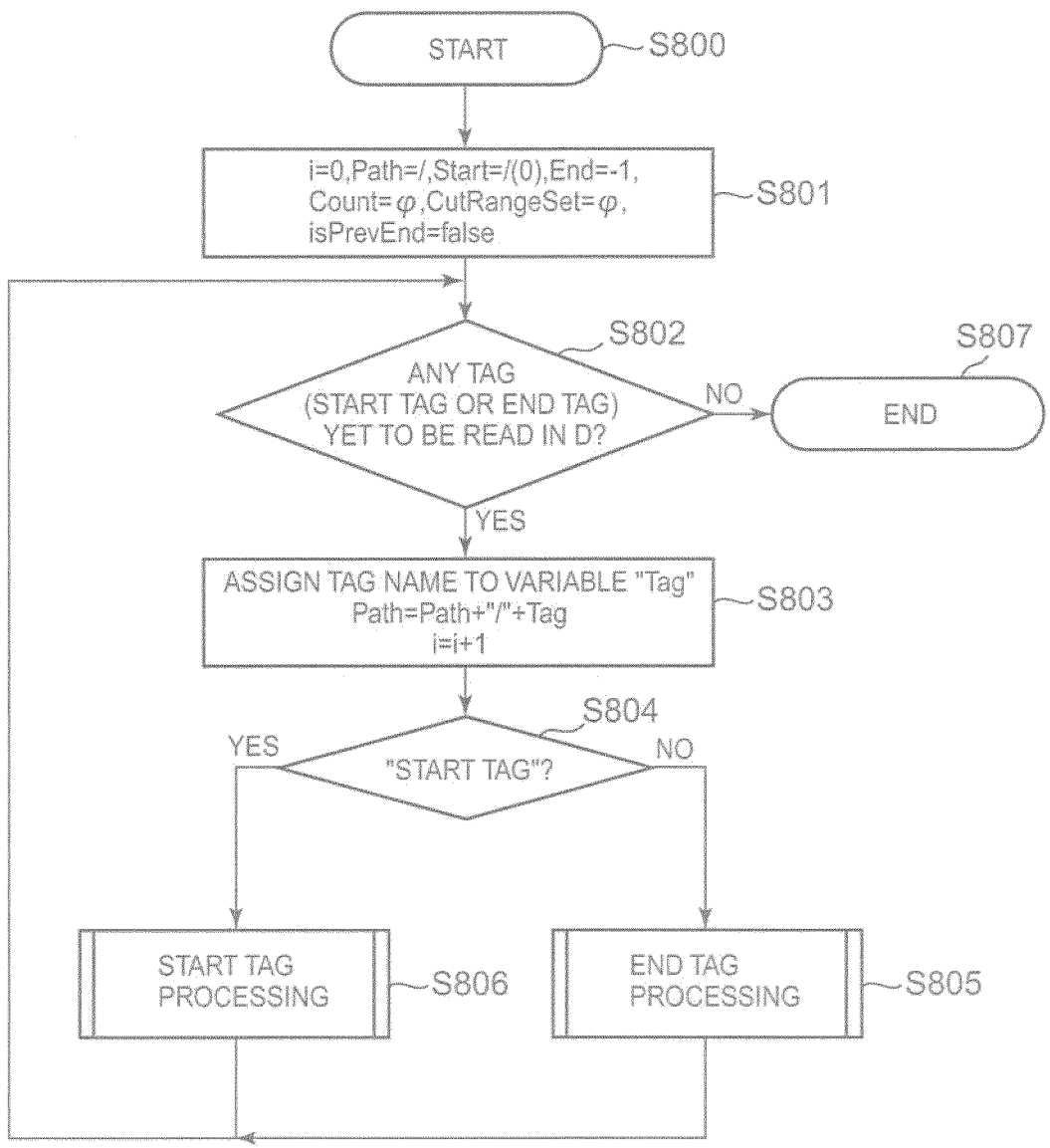
FIG. 8 is a detailed flowchart of the XML cutting position calculating processing performed in step S701 in FIG. 7.

FIG. 8 is a detailed flowchart of the XML cutting position calculating processing which is carried out in step S701 in FIG. 7. The processing in FIG. 8 starts in step S800 when the processing in FIG. 7 is called. In step S801, the following initialization is performed: i=0, Path=/, Start=/(0), End=−1, Count=ϕ, CutRangeSet=ϕ, and is PrevEnd=false. The variables are defined as in the following Table 1.

TABLE 1

D: XML document
P: XPath for cutting ranges
Output:
CutRangeSet: a set of XML cutting positions, or, a data structure corresponding to the cutting position list. Each element holds the start position number and the end position number of a tag in the form of (begin, end).
The elements are arranged in ascending order of "begin". Ex:
CutRangeSet = [(3, 6), (7, 10), (12, 17)]
Explanation of symbols used in flowchart:
i: the position number of the tag currently read in D
Path: XPath of the tag currently read in D (implemented as a stack)
Start: XPath with the position number of the tag as a candidate of cutting start position (implemented as a stack)
End: the position number of the tag as a candidate of cutting end position. Set to "−1" if no candidate has been found yet.
Count: a stack which holds the number of times of occurrence of P, with hierarchical structure in XML document
isPrevEnd: Set to "true" if the tag read immediately before is an end tag (</root>, </a>, etc.); otherwise, set to "false".

Following the initialization of the values of the variables in step S801, it is determined in step S802 whether the XML document being processed includes a start or end tag yet to be read. If there remains no tag to be read (No), it is determined that the XML document has been processed to the end, and the process is terminated in step S807.

On the other hand, if it is determined in step S802 that the XML document D being processed includes a tag yet to be read (Yes), in step S803, the name of the tag is assigned to the variable "Tag" to calculate Path=Path+"/"+Tag, and the position number of the tag is incremented by 1. With the processing in step S803, the XPath from a specific start tag to the end tag is generated. In step S804, it is determined whether the value of the variable "Tag" corresponds to a start tag. If so (Yes), start tag processing is carried out in step S806. If it is determined in step S804 that the value of the variable "Tag" does not correspond to a start tag (No), end tag processing is carried out in step S805. Upon completion of the respective tag processing in steps S805 and S806, the process returns to step S802. The process is repeated until all the tags in the XML document D have been processed.

Figure 9:
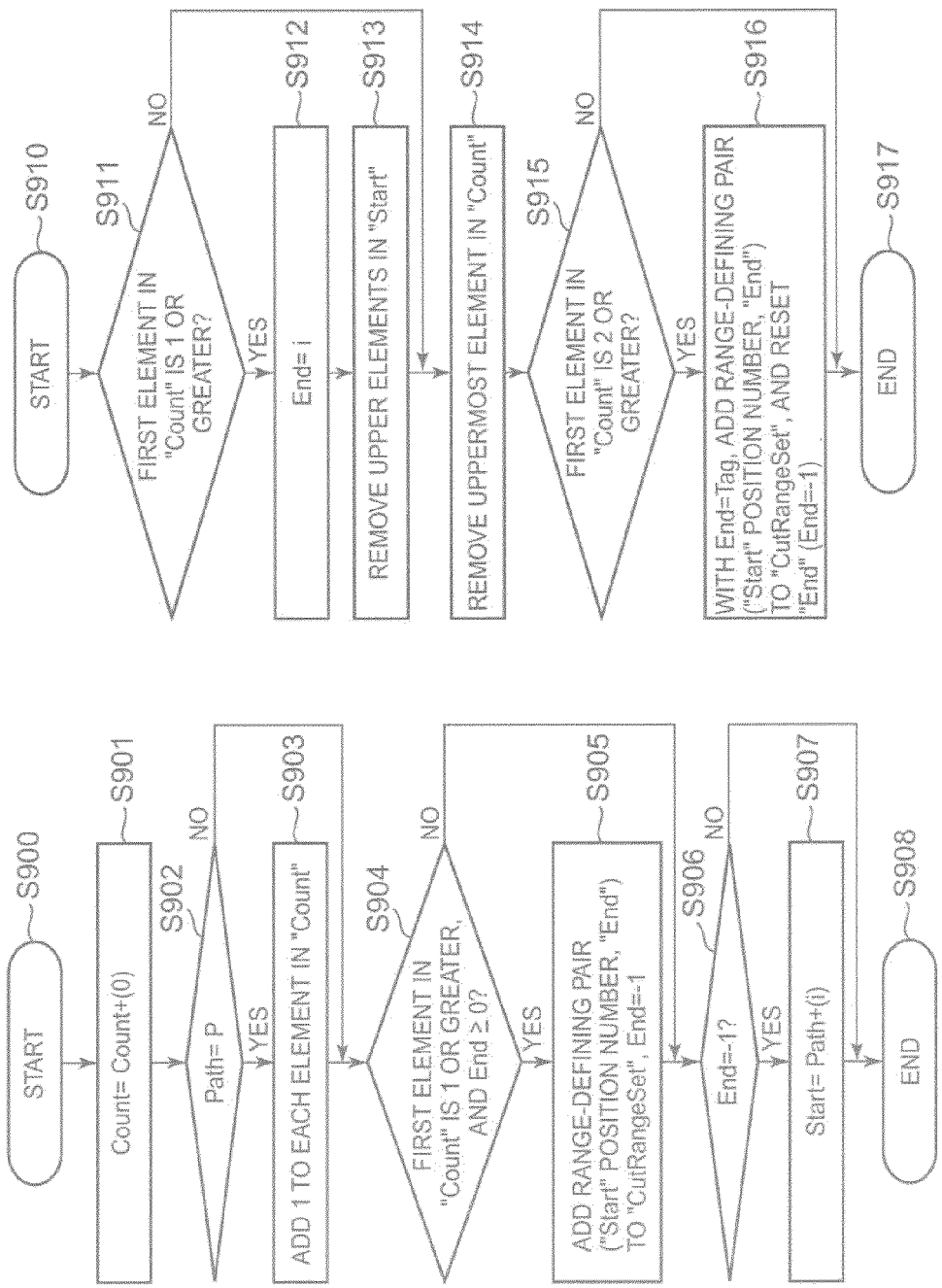
FIG. 9 is a detailed flowchart of the start tag processing and the end tag processing in steps S805 and S806, respectively, in FIG. 8.

FIG. 9 is a detailed flowchart illustrating the start tag processing and the end tag processing performed in steps S805 and S806, respectively, in FIG. 8. Steps S900 to S908 correspond to the start tag processing, and steps S910 to S917 correspond to the end tag processing. The start tag processing in steps S900 to S908 will firstly be described.

The start tag processing starts in step S900 when the control is passed from step S804. In step S901, "0" is registered in a Count stack by setting Count=Count+(0). In step S902, it is determined whether Path=P, to determine whether the XPath of the tag currently being read in D corresponds to the unit used for cutting into value partitions. If Path=P is not satisfied (No), the process jumps to step S904, where it is determined whether to output the current candidate for the cutting position, according to the determination as to whether "the first element in Count is 1 or greater, and End≥0". If it is determined in step S904 that the first element in Count is 0 or End<0 (No), the process jumps to step S906, where it is determined whether the variable End=−1, i.e., whether the end tag is a candidate of cutting end position. If End=−1 (Yes), the position number in Start is incremented by "i" by setting Start=Path+(i) in step S907, and in step S908, the control is passed to step S802 in FIG. 8 to terminate the process.

On the other hand, if it is determined in step S902 that Path=P (Yes), in step S903, "1" is added to all the elements in Count, and it is determined in step S904 whether the following condition holds: "the first element in Count is 1 or greater, and End≥0". In this case, the determination in step S904 returns a positive answer (Yes), and thus, in step S905, the pair of (Start position number, End position number) is added to the variable "CutRangeSet", and End is set to "−1". In step S906, it is determined whether End=−1. Under these conditions, the determination in step S906 returns a positive answer (Yes), and thus, in step S907, the position number in Start is incremented by "i", and in step S908, the control is returned to step S802 in FIG. 8 to terminate the process.

The end tag processing shown in FIG. 8 starts in step S910, which is called in response to the determination in step S804 that the value in the variable "Tag" does not correspond to a start tag. In step S911, it is determined whether the first value in Count is 1 or greater, and if so (Yes), End is set to "i" in step S912 to be ready for detection of a next start tag. In step S913, upper elements in Start are removed, and in step S914, the uppermost element in Count is removed. The processing of removing the upper elements in Start and the uppermost element in Count will be described later in more detail with reference to FIG. 10.

If it is determined in step S915 that the first element in Count is 2 or greater, it means that the value of the Tag currently being determined has already appeared under its parent tag. Thus, in step S916, with the position number of the variable "Tag" under determination at that time being set as "End", the Start position number and the End are associated with each other and added as a range-defining pair to CutRangeSet. Then, the value of "End" is reset to −1. Thereafter, the process is terminated, with the control passed from step S917 to step S802 in FIG. 8.

Figure 10:
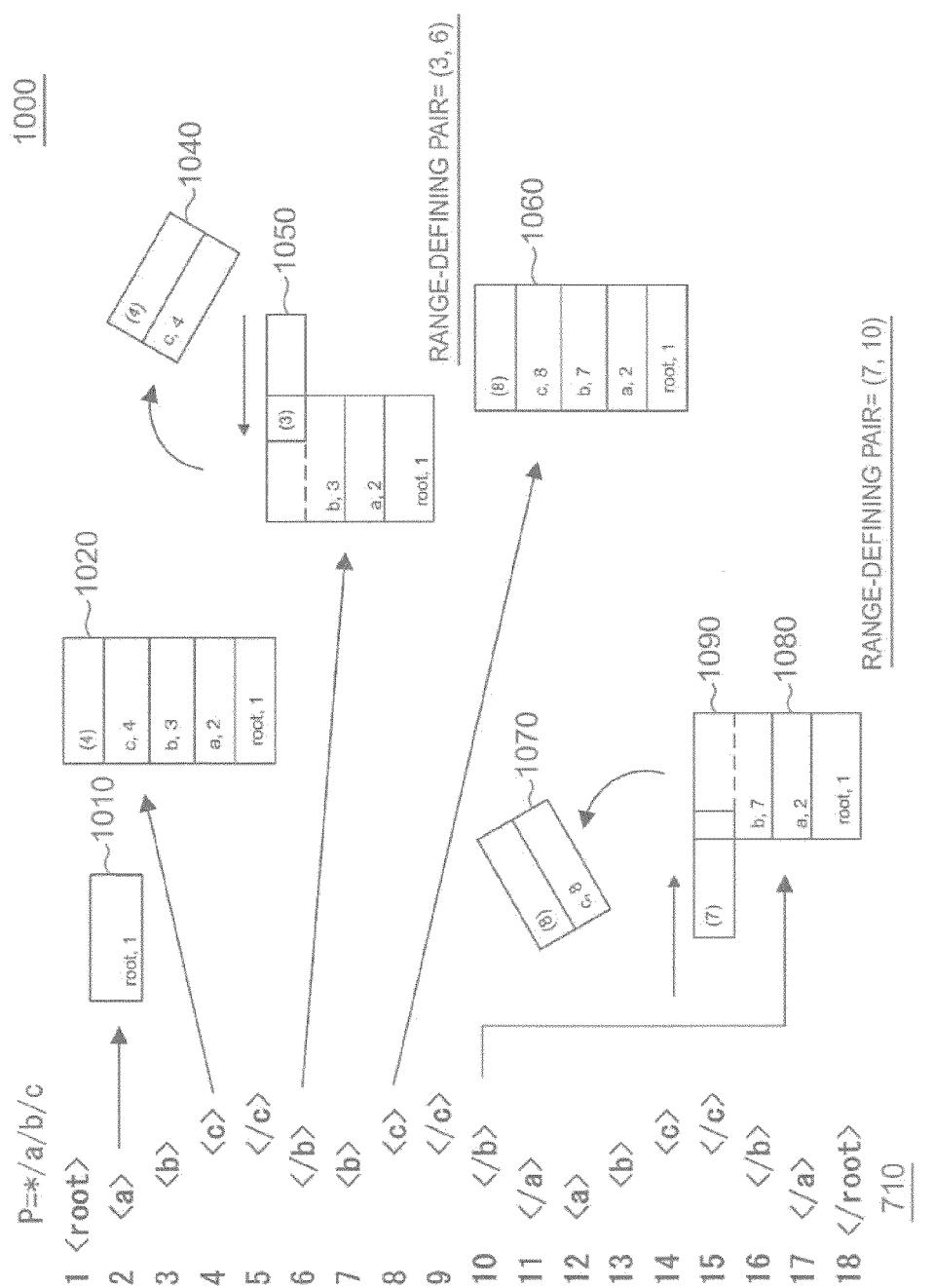
FIG. 10 illustrates the processing of removing the upper elements which is performed on the Start stack in step S913 in FIG. 9.

FIG. 10 illustrates the process of removing the upper elements in the Start stack, which is performed in step S913 in FIG. 9. In the Start stack, elements (columns) are stacked according to the tags necessary for identifying a child node to be cut, among the tags included in XPath=P. The Start stack has a function of identifying the beginning of the child node to be cut, by detecting the end tag thereof. For the Start stack, the XML parser 224, in its first run, analyzes the tags of the XML document to be processed, to identify which tag is included in a specific line number of the XML document, for registration in the form of the cutting position list 710 in an appropriate storage area.

The XML cutting unit 226 reads the cutting position list 710 generated by the XML parser 224, for addition to the Start stack. To this end, the XML cutting unit 226 restarts the XML parser 224 for the second run, and when a first root tag is found, it registers the root tag and its position number in the stack. Thereafter, every time a tag is detected, it registers the tag and its position number in the stack. For example, as the process proceeds to the line number of 5, the tag=</c> is detected. The XML cutting unit 226 identifies XPath=P=*/a/b/c, which is to be a cutting unit, and adds the tags and their position numbers to the stack until the tag <c> is detected. As a result, when the process proceeds to the line number of 4, a value stack 1020 is registered in the Start stack. It is noted that the cutting unit describes an attribute definition tag which provides a unit subtree. The cutting unit may be described using a wild card, as in the illustrated embodiment, or may be defined by description from the root to the last attribute definition tag in the first unit subtree.

When the tag <c> is detected, the position number where the tag <c> has been detected is added to the uppermost column in the stack. As the end tag </c> corresponding to the tag <c> is detected, and at the time of detection of a tag </b> thereafter in the case of the illustrated embodiment, it is determined that the unit subtree to be cut has been detected, and the upper two columns 1040 in the Start stack are removed and the position number of the corresponding, immediately preceding start tag <b> is added as an uppermost column 1050 in the stack, whereby a value stack 1030 is generated. At this time, the position number of 6 is registered in the variable "Tag". The unit subtree is set as a section from the position number registered in the uppermost column in the stack to the value registered in the variable "Tag" at that time. In the illustrated embodiment, it is obtained as a first range-defining pair=(3, 6).

Thereafter, in the value stack 1030, the value that has been registered for the tag <b> is updated with the position number of the detected tag <b>. When the tag <c> is detected in the position number of 8, a value stack 1060 is generated as in the case of the value stack 1020. As the process further proceeds, when the </b> tag is detected, the same processing as the one performed on the value stack 1020 described above is carried out to remove the upper two columns 1070, and the position number of the corresponding, immediately preceding start tag <b> is added as the uppermost column 1090 in the stack, so that a value stack 1080 is generated.

Upon completion of this process, a second range-defining pair=(7, 10) is determined. The above processing is repeated until there is no more tag to be processed or until the </root> tag is detected, whereby the XML document to be processed is cut into the unit subtrees. The results of cutting are stored in the form of a subtree data list, in an appropriate storage space in the server 130.

Figure 11:
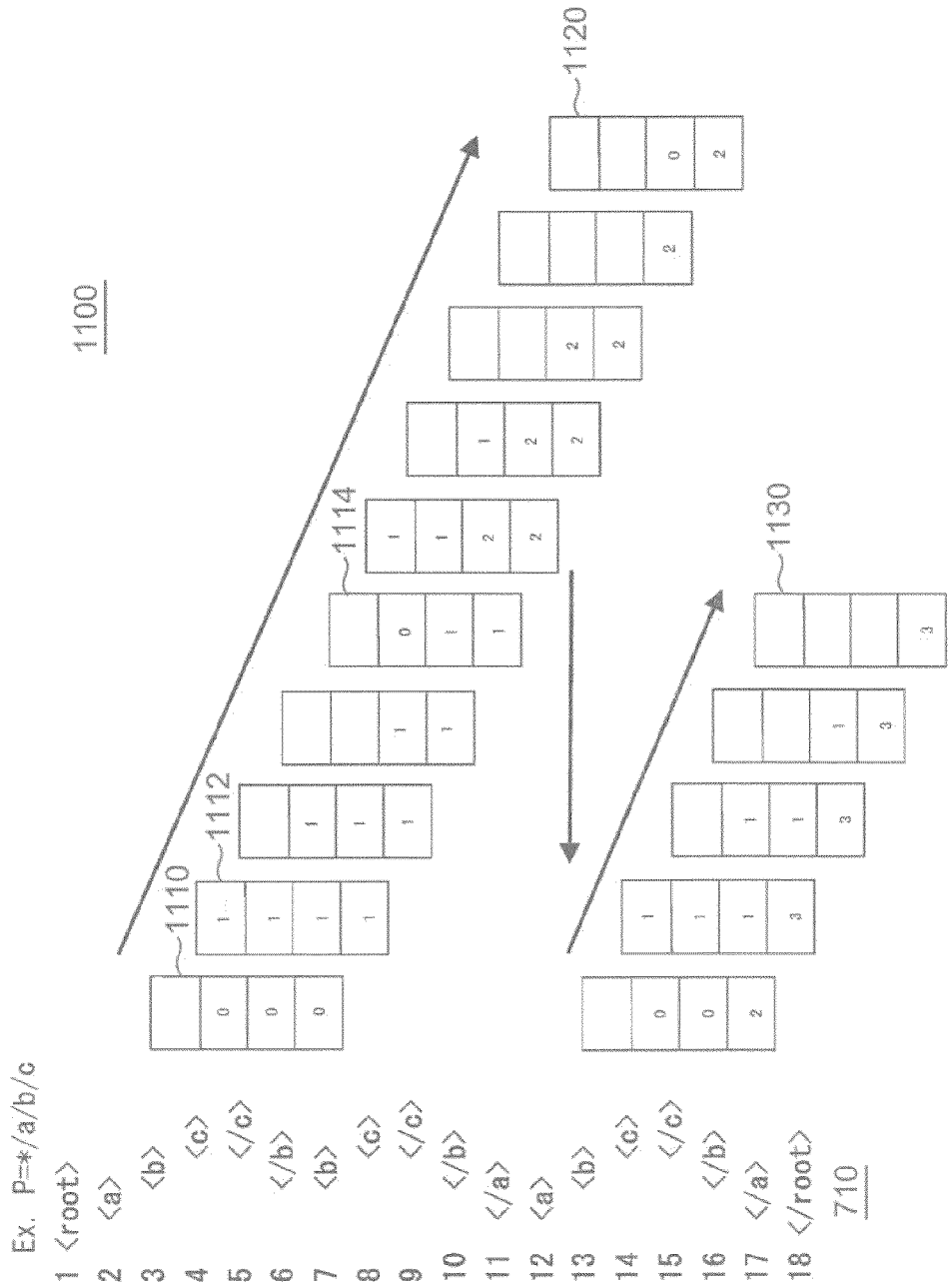
FIG. 11 is a schematic diagram illustrating the processing of updating a Count stack which is implemented in the present embodiment according to the processing in FIG. 9, and showing an embodiment of transition 1100 of values in the generated value stack.

FIG. 11 is a schematic diagram illustrating the processing of updating a Count stack which is implemented in the present embodiment according to the processing in FIG. 9. FIG. 11 shows an embodiment of transition 1100 of values in the generated value stack. The values registered in the stack shown in FIG. 11 are updated according to the XPath, and the last start tag in the XPath used as the cutting unit serves as a path counter of the XPath to be cut which is included in the XML document being processed. In the illustrated embodiment, XPath=P=*/a/b/c. The XML cutting unit 226 in the server 130 generates the Count stack, in parallel with generation of the Start stack shown in FIG. 10, during the second run of the XML parser 224.

In the second run of the XML parser 224, registration of the value stack starts when the root tag included in the XPath is detected. Thereafter, every time a succeeding start tag in the XPath is detected, a new column is added, and the value=0 is registered therein. As the process proceeds, when the start tag of the last element in the XPath is detected, "1" is added to the values in all the columns. At this stage, the value stack 1112 is generated.

Thereafter, still in the second run of the XML parser 224, the values in the upper columns in the stack are deleted until a next start tag is detected, and when the start tag as a constituting element of the XPath is detected, "0" is registered as a value of the uppermost column in the stack. As the processing by the XML parser 224 proceeds, when the last tag constituting the XPath is detected, "1" is added to the values in the stack again, so that the value stack 1114 is generated. The value in the lowermost column in the stack provides the number of the unit subtrees detected in the XML document being processed. Thereafter, the similar processing is repeated, and when the line number reaches "11", a column with the value of 0 is stacked again. Upon detection of the tag <c> in the line number of 14, "1" is added to the values in all the columns in the stack, and a third range-defining pair (13, 16) is output. Finally, when </root> in the line number of 18 is detected, all the values in the value stack are deleted, whereby termination of the process is detected. As a result, it is determined that the XML document shown in FIG. 11 includes three unit subtrees.

FIG. 12 shows an embodiment of the subtree data list for use in cutting the XML document, which is generated in the processing shown in FIGS. 9 to 11. In the embodiment shown in FIG. 12, the data structure of the subtree data list 1200 is shown in association with the cutting position list 710, to clarify the relation with the corresponding lines in the XML document. As shown in FIG. 12, according to the processing by the XML cutting unit 226, the ranges of the unit subtrees are registered in the set variable "CutRangeSet" for identification of the child nodes included in the XML document being processed, successively in the order of (3, 6), (7, 10), and (13, 16) according to the structure of the XML document.

In the subtree data list, the data of the Start stack, the values in the Count stack, and the value of End are registered, which are generated in the start tag processing and the end tag processing. The subtree data list provides the data for use in the subsequent partitioning which is carried out taking account of the hierarchical structure of the unit subtrees in the XML document.

The server 130 of the present embodiment uses the line numbers registered in CutRangeSet in FIG. 12 to specify the subtrees in the XML document to be registered in the base partition, and completes the cutting of the subtrees to be partitioned into the base partition and the value partitions by the XML cutting unit 226.

FIG. 13 is a flowchart illustrating the processing of generating the subtrees to be registered in the base partition. The processing in FIG. 13 starts in step S1300 as it is called when the identification of the unit subtrees is finished and the data structure shown in FIG. 12 is built. In step S1301, the values of i, j, T, and Base are initialized, where "i" represents a line number, "j" is a counter for counting the unit subtrees, and "k" corresponds to the number of unit subtrees, i.e., the first value in Count. Further, "T" is a stack in which the unit subtrees are registered, and "Base" is a stack in which the subtrees in the XML document that are to be registered in the base partition are registered.

In step S1302, the XML parser 224 is called, which processes the cutting position list 710 to determine whether D includes a tag yet to be read. If there is no tag yet to be processed (No), it means that the processing on the XML document being processed has been completed, and thus, in step S1313, the subtrees generated till that time for registration in the base partition and the unit subtrees generated till that time for registration in the value partitions are provided with pointers, and registered in the corresponding partitions.

On the other hand, if it is determined in step S1302 that there is a tag yet to be read (Yes), in step S1303, the tag being processed is assigned to the variable "Tag", and the counter "i" is incremented by 1. In step S1304, it is determined whether j>k or i<bj. This is done for the purpose of efficiently processing the range of the unit subtree. If it is determined in step S1304 that neither j>k nor i<bj is satisfied (No), it is determined in step S1305 whether i<ej. If i<ej (Yes), it means that the line position being processed is within the range of a specific child node, and thus, in step S1306, it is added to the stack T by setting T=T ∪Tag.

In the case where j>k or i<bj in step S1304 (Yes), it means that the line position being processed is not included in the unit subtree, and thus, the process branches to step S1308, where it is added to the stack Base by setting Base= Base ∪Tag. If i<ej is not satisfied (No), it means that the line position currently being processed is out of the range of a specific child node, and thus, in step S1309, the counter j is incremented by 1 by setting j=j+1, and Base=Base ∪Tag is set. At this stage, the tag of the line number being processed is registered in the Base stack, and T is output into an appropriate value partition as a subtree. Thereafter, T is reinitialized to ϕ(T=ϕ).

Following the processing in step S1309, in step S1306, T=T ∪Tag is set. In this case, T has been reinitialized to ϕ(T=ϕ) in step S1309, and thus, the subtree corresponding to the unit subtree is accumulated in T. Following the processing in step S1306, in step S1307, it is determined whether i=bj. If i=bj (Yes), it means that the line position currently being processed corresponds to the first line of the unit subtree, and thus, in step S1308, the tag information is registered as a candidate of the index to be registered in the base partition, by setting Base=Base ∪Tag. The process then returns to step S1302, and is repeated until there is no tag left in D.

On the other hand, if i=bj is not satisfied in step S1307 (No), it means that the line is not the one to be registered in the base partition, and thus, the process directly returns to step S1302, and is repeated until there remains no tag in D. With the processing described above, the subtrees that are to be registered in the base partition and the subtrees that are to be registered as the unit subtrees can be separated from the XML document being processed.

Figure 14:
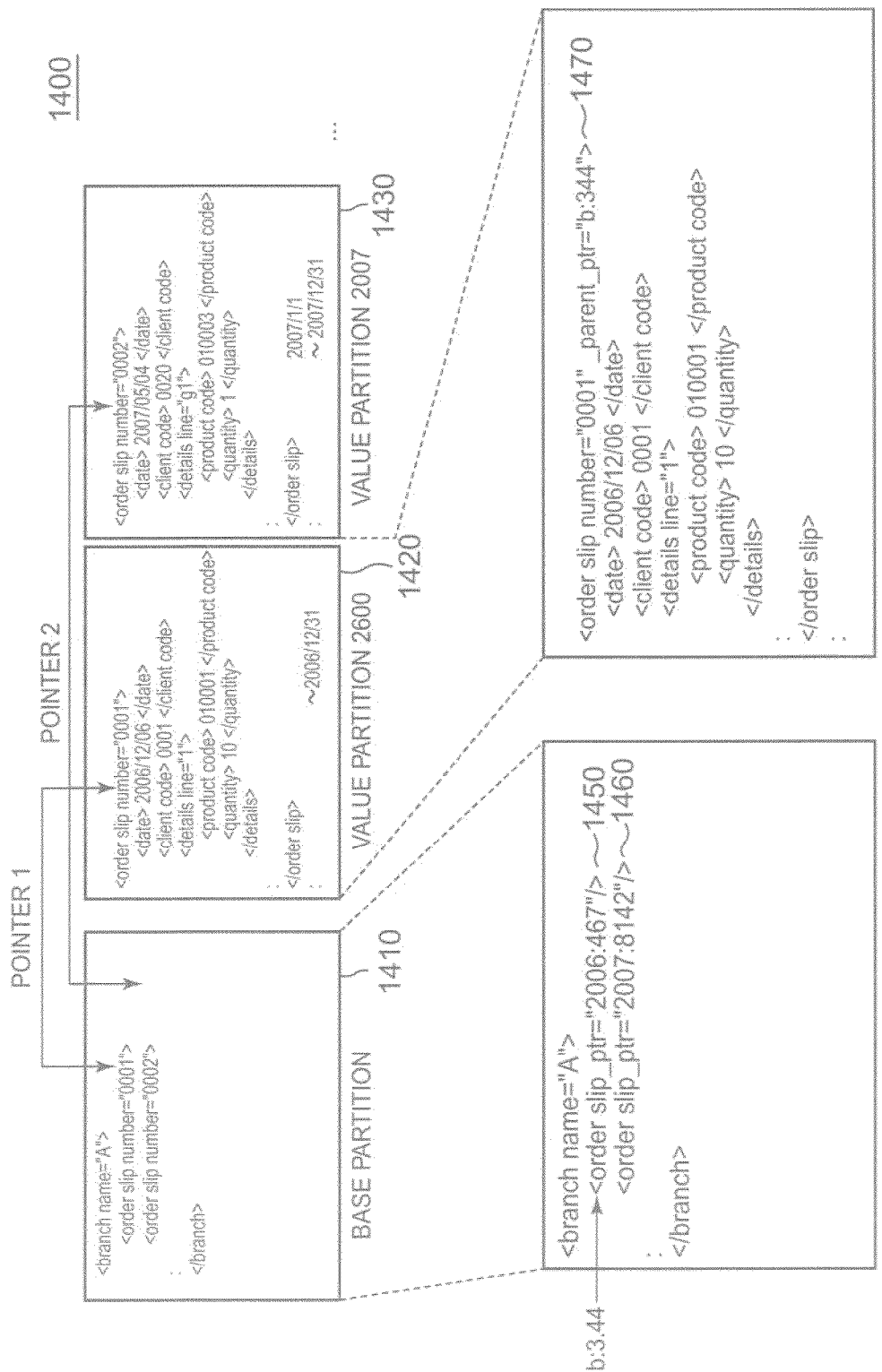
FIG. 14 shows an embodiment in which ptr="2006:467" and ptr="2007:8142" are added as hidden attribute values to <order slip> tags 1450 and 1460, respectively, in the base partition 1410.

When cutting of the XML document is completed, the cut-XML registration unit 228 is called, which performs addition of the pointers and registration of the unit subtrees to the partitions. FIG. 14 shows an embodiment of the partitioning according to the present embodiment. With the processing of the present embodiment, the XML document 300 shown in FIG. 3 is partitioned to the base partition 1410 and the value partitions 1420 and 1430. In the present embodiment, for the purposes of separating the XML document to the base partition and the value partitions while maintaining the original hierarchical structure of the XML document, pointers are generated to enable cross-reference between the unit subtrees and the indices registered in the partitions, and the generated pointers are registered in the indices and in the line positions of the unit subtrees corresponding to the indices.

For the pointers, unique values are set according to the partitions. In each index in the base partition, a pointer assigned to the corresponding unit subtree is registered, while in each unit subtree, a pointer assigned to the corresponding index in the base partition is registered. For generating the pointers, various embodiments may be adopted. For example, at the time of generation of the base and value partitions, counters may be provided for counting, e.g., the line numbers of the subtrees added to the corresponding partitions.

When an index is added to the base partition, a counter value Cb (Count_base) in the base partition may be acquired. For the corresponding unit subtree registered in the value partition, a counter value Cv (Count_value) in the value partition corresponding to the index may be acquired. Then, the counter value Cv serving as a pointer may be added to the index, and the counter value Cb as a pointer may be added to the unit subtree corresponding to the index.

Further, for the pointers, instead of generating and adding the values according to the partitions as in the above-described embodiment, pointers Rb (Random_base) and Rv (Random_value) may be generated at random when registering the index and the unit subtree referred to by the index, respectively, and the generated pointers may be added to the corresponding lines in association with each other. Furthermore, the pointers may be embedded in various manners. For example, in a first embodiment of the pointer embedding processing, the pointer values may be embedded in the index and in the corresponding XML tag in the unit subtree as hidden attributes of the index and the XML tag.

For example, FIG. 14 shows one embodiment in which values ptr="2006:467" and ptr="2007:8142" are added as hidden attribute values to the <order slip> tags 1450 and 1460, respectively, in the base partition 1410. In response thereto, b:344, which is a pointer to an index in the base partition, is added in the form of parent_ptr="b:344" as the hidden attribute value to the corresponding <order slip> tag 1470 in the unit subtree. This embodiment can be implemented in the existing XMLDB at a low cost, independently of the implementation of the existing XMLDB, and without the need of an additional application for the search processing.

In a second embodiment of the pointer embedding processing, the implementation of the existing XMLDB is modified. Specifically, in a record in the node table which is generated for the XMLDB, the corresponding pointer value is additionally embedded. According to this embodiment, the tags with the pointers added thereto are prevented from being included in a plurality of partitions, and thus, consumption of the hardware resources is reduced advantageously. However, because it involves modification of the node table registration processing in the existing XMLDB and, hence, modification of the implementation of the XMLDB, this embodiment may suitably be used when partitioning is carried out at the implementation stage of the XMLDB.

FIG. 15 shows an XML document which is partitioned according to the present embodiment, and an embodiment of registration in the base and value partitions. The XML document 1510 being partitioned includes a root node <branch name="A">, and under the root node, a unit subtree 1512 starting at the <order slip number="0001"> and a unit subtree 1514 starting at the <order slip number="0002">. The unit subtrees are different from each other in date, which is the attribute for partitioning.

The first tag <order slip . . . > in each of the unit subtrees 1512 and 1514 is added to the base partition 1530 as an index. According to the processing shown in FIG. 13, the tag of the root node is not included in the partitioning unit XPath=P=*/a/b/c, and thus, it is grouped into the base partition 1530. In the value partitions 1532 and 1534, the unit subtrees including the tags having the attribute values to be partitioned are registered. Cross-reference between the base partition 1530 and the value partitions 1532 and 1534 are enabled with the pointers.

In the case where one of the clients 110 to 118 issues a search request to the server 130, the server 130 uses a keyword included in the search request to perform searching, and the search result generating unit 216 generates a search result reflecting the hierarchical structure. The search result generated is transmitted to the one of the clients 110 to 118 via the network adapter 202.

In the present embodiment, SQL functions "XMLQUERY" and "XMLEXISTS", for example, are defined for the search of XMLDB. The command "XMLQUERY" is an SQL scalar function which enables execution of an XQuery expression in the SQL context. "XMLQUERY" can be used to pass a variable to the XQuery expression designated by XMLQUERY. Further, "XMLQUERY" returns an XML value which is an XML sequence.

Here, the argument to "XMLEXISTS" determines whether the XQuery expression returns a sequence having at least one term. If the XQuery expression designated in the argument returns an empty sequence, "XMLEXISTS" returns "false";

otherwise, it returns "true". For example, an SQL statement which returns a list of "/branch/order slip/date" with the data value of 2006/12/01, included in the XML document stored in the column of "infoxml" in the "bookstore" table, may be described as follows:

[Expression 1]
SELECT XMLQUERY ('$i/branch/order slip' PASSING infoxml AS "i")
FROM bookstore
WHERE XMLEXISTS ('Si/branch/order slip/[date="2006/12/01"]'
PASSING infoxml AS "i")

Further, in the case where the date tags in the value partitions are referred to during the search, if the date tag is not provided with a pointer, it is appreciated that its parent element (=order slip) exists in the same partition, rather than in the base partition. On the other hand, if the date tag is provided with a pointer, it is appreciated that the same has been partitioned, and as a result, the parent node of the order slip is registered in the base partition. This allows the existing SQL commands to be used for the XMLDB whether or not it is partitioned.

Further, in the case where a search condition is designated for a path other than the XPath that has been used for partitioning, all the partitions, and the base partition as required, may be searched and the results may be merged. As such, it is possible to process the search request using the similar processing as that for the conventional RDB partition table.

Figure 16:
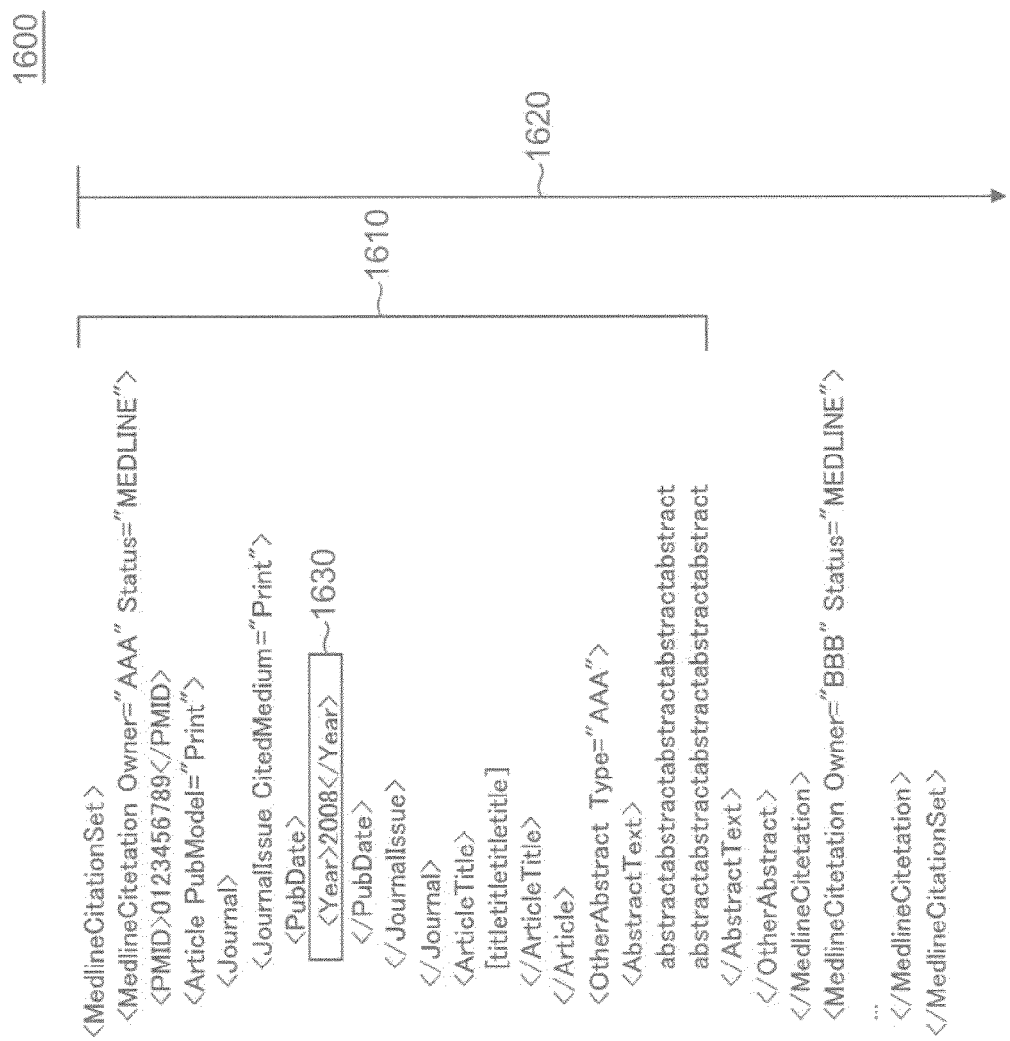
FIG. 16 shows an embodiment of the XML document which can be partitioned according the present embodiment.

FIG. 16 shows an embodiment of the XML document which can be partitioned according to the present embodiment. The embodiment shown in FIG. 16 is a part of an XML document registered in a MEDLINE database. The MEDLINE database is a public database for reference to medical literature, and contains about 16 million records. The data available for downloading is in the form of XML files, with one XML file usually containing 30 thousand articles.

The XML document of the embodiment shown in FIG. 16 may be partitioned according to the present embodiment using the publication years of the articles, for example, as the target data to be partitioned. With the query to search for, e.g., only the articles published in the past five years, the space being searched considerably decreases, and thus, the speed of the search significantly improves. In partitioning, pointers and indices generated allow the original hierarchical structure at the time of registration in the XMLDB to be maintained, and accordingly, the partitioning can be performed efficiently, with the search efficiency of the XMLDB substantially maintained.

Further, in the embodiment shown in FIG. 16, a unit subtree (MedlineCitation) in a unit of article may be registered in a value partition, and thus, even in the search performed to obtain the article, it is only necessary to access the corresponding partition, whereby the search efficiency considerably improves. As described above, it is possible to improve the search efficiency for the data which includes a plurality of records used in the RDB as units of tags, the records being collected into a single XML file, and which includes an attribute for use in partitioning.

The above-described functions of the present embodiment may be implemented by a machine executable program which is described in an object-oriented programming language such as C++, Java™, JavaBeans™, Java™ Applet, Java™ Script, Perl, or Ruby, and the program may be stored in a machine readable storage medium such as a hard disk drive, CD-ROM, MO, flexible disk, EEPROM, or EPROM, for distribution, or it may be transmitted via a machine readable medium, such as a network in the form readable and executable by another apparatus.

While the present invention has been described with reference to the embodiment, the present invention is not limited to the above-described embodiment. Rather, various modifications, additions, deletions, as well as other embodiments are possible within the range conceivable by those skilled in the art, and such embodiments are within the scope of the present invention as long as they exert the functions and effects of the present invention.

What is claimed is:

1. An information processing apparatus, comprising:
   a processor;
   a non-transitive storage area;
   a database, stored in the non-transitive storage area, storing a plurality of stored values having a hierarchical structure, wherein the plurality of stored values represent data stored in a particular field of the database;
   a partition generating unit, executed on the processor, which generates a value partition, the value partition having a unit subtree, the unit subtree having target data of the plurality of stored values to be partitioned in the structured document separated and registered according to a stored value of the plurality of stored values of the target data, and generates a base partition which includes a second subtree distinct from the unit subtree and an index for uniquely identifying the unit subtree, wherein the unit subtree includes a plurality of the start tags, and the index is generated from a first one of the start tans in the unit subtree;
   a parser unit, executed on the processor, which identifies positions of a start tag and an end tag, the start tag and the end tag defining a start value and an end value, the start value and the end value each corresponding to a corresponding value of the plurality of stored values in the structured document, to generate a cutting position list corresponding to the hierarchical structure and register the cutting position list in a storage area;
   a cutting unit, executed on the processor, winch separates the unit subtree and the index for referring to the unit subtree from the structured document by referring to the cutting position list to identify the start tag position and the end tag position of the unit subtree to be cut, the unit subtree including the target data, wherein in order to separate the unit subtree for registration in the value and base partitions by referring to the cutting position list, the cutting unit generates a subtree data list and registers the generated list in the storage area, the subtree data list including a range-defining pair in which a start position and an end position of the unit subtree included in the structured document are associated with each other and an occurrence counter in which the order of description of the unit subtree in the structured document is registered; and
   a registration unit, executed on the processor, which registers the unit subtree and the index for identifying the unit subtree, separated by the cutting unit, in the value and base partitions, wherein the registration unit adds pointers to the unit subtree and the index for uniquely identifying the unit subtree to allow cross-reference between the unit subtree and the index, before registering the unit subtree and the index in the value and base partitions.

2. The information processing apparatus according to claim 1, further comprising:
   an SQL processing unit which uses the target data to search for the unit subtree registered in the value partition; and a search result generating unit which generates a result of the search performed by the SQL processing unit.

3. The information processing apparatus according to claim 1, wherein the structured document is described in XML, and the database is an XMLDB which enables storage and search of XML documents.

4. A database system, comprising:
a database, stored in a non-transitory storage area, storing a plurality of stored values having a hierarchical structure, wherein the plurality of stored values represent data stored in a particular field of the database;
a data management unit, executed on a processor, which generates and manages a value partition in which as unit subtree including target data of the plurality of stored values to be partitioned in the structured document is separated and registered according to a stored value of the plurality of stored values of the target data, and a base partition which includes a subtree other than the unit subtree and an index for uniquely identifying the unit subtree, wherein the unit subtree includes a plurality of start tags, and the index is generated from a first one of the start tags in the unit subtree;
an SQL processing unit, executed on the processor, which processes a search request for searching the structured document registered in the database, the search request designating the hierarchical structure of the structured document; and
a search result generating unit, executed on the processor, which generates a search result with respect to the search request by using a result of individual search performed on the value partition by the SQL processing unit;
the data management unit including:
a partition generating, unit which generates the partitions;
a parser unit which identifies positions of a start tag and an end tag defining a start value and an end value, the start value and the end value each corresponding to a corresponding value of the plurality of stored values in the structured document, to generate a cutting position list corresponding to the hierarchical structure and register the cutting position list in a storage area;
a cutting unit which separates the unit subtree and the index for referring to the unit subtree from the structured document by referring to the cutting position list to identify the start tag position and the end tag position of the unit subtree to be cut, the unit subtree including the target data, wherein in order to separate the unit subtree or registration in the separate partition by referring to the cutting position list, the cutting unit generates a subtree data list and registers including a range-defining pair in which a start position and an end position of the unit subtree included in the structured document are associated with each other and an occurrence counter in which the order of description of the unit subtree in the structured document is registered; and
a registration unit which registers the unit subtree and the index for identifying the unit subtree, separated by the cutting unit, in the separate partitions, wherein the registration unit adds pointers to the unit subtree and the index for uniquely identifying the unit subtree to allow cross-reference between the unit subtree and the index, before registering the unit subtree and the index in the separate partitions.

5. The database system according to claim 4, wherein the structured document is described in XML, and the database is an XMLDB which enables storage and search of XMI documents.

6. A method having a database, the database including a structured document, the method comprising:
separating target data into partitioned data base on a plurality of values associated with the target data, wherein the plurality of values represent data stored in a particular field of the database, wherein the index uniquely identifies the unit subtree and wherein the unit subtree includes a plurality of start tags;
generating a value partition having a unit subtree, the unit subtree having the partitioned data therein;
generating a base partition, the base partition having a first subtree distinct from the unit subtree and an index associated with the unit subtree, wherein the generating the base and value partitions further includes the step of generating the index by identifying a first one of the start tags in the unit subtree;
identifying positions of a start tag and an end tag associated with a start value and an end value, the start value and the end value each corresponding to a corresponding value of the plurality of stored values in the structured document;
generating a cutting position list corresponding to the hierarchical structure based on the start tag and the end tag;
storing the cutting position list in a storage area, wherein storing the cutting position list includes adding pointers to the unit subtree and the index for uniquely identifying the unit subtree to allow cross-reference between the unit subtree and the index, before registering the unit subtree and the index in the separate partitions;
separating the unit subtree and the index from the structured document based on the cutting position list to identify the start tag position and the end tag position of the unit subtree to be cut, wherein in order to separate the unit subtree for registration in the base and value partitions by referring to the cutting position list, separating the unit subtree and the index further includes generating a subtree data list and registering the generated subtree data list in the storage area, the subtree data list including a range-defining pair in which a start position and an end position of the unit subtree included in the structured document are associated with each other and an occurrence counter in which the order of description of the unit subtree in the structured document is registered; and
registering the unit subtree and the index to identify the unit subtree, separated in the separating step, in the base and value partitions;
searching the database based on at least one of the value partition and the base partition; and
displaying the results of the search.

7. The information processing method according to claim 6 and further comprising:
searching for the unit subtree registered in the value partition by using the target data; and
generating a search result by merging a result of individual search performed on the value partition in the searching step.

8. A computer program product, the computer program product comprising:
a non-transitory computer readable storage medium having computer readable program code embodied therewith, the computer readable program code configured to execute on a processor to:

generate a value partition in which a unit subtree including target data stored in a database, to be partitioned in structured document is separated and registered according to a plurality of values of the target data, wherein the plurality of values represent data stored in a particular field of the database, and a base partition which includes a subtree other than the unit subtree and an index for uniquely identifying the unit subtree, wherein the unit subtree includes a plurality of start tags, and generating the value and base partitions includes generating the index by identifying a first one of the start tags in the unit subtree;

identify positions of a start tag and an end tag defining a start value and an end value, the start value and the end value each corresponding to a corresponding value of the plurality of stored values in the structured document to generate a cutting position list corresponding to a hierarchical structure of the plurality of values and register the cutting position list in a storage area;

separate the unit subtree and the index for referring to the unit subtree from the structured document by referring to the cutting position list to identify the start tag position and the end tag position of the unit subtree to be cut, the unit subtree including the target data, wherein in order to separate the unit subtree for registration in the separate partition by referring to the cutting position list, separating the unit subtree and index includes generating a subtree data list and registering the generated list in the storage area, the subtree data list including a range-defining pair in which a start position and an end position of the unit subtree included in the structured document are associated with each other and an occurrence counter in which the order of description of the unit subtree in the structured document is registered; and register the unit subtree and the index for identifying the unit subtree, separated in the separating step, in the separate partitions.

9. An information processing apparatus including a database in which a structured document having a hierarchical structure is managed, the information processing apparatus comprising:
  a processor:
  a partition generating unit, executing on the processor, which generates a value partition in which a unit subtree including target data to be partitioned in the structured document is separated and registered according to a value of the target data, and a base partition which includes a subtree other than the unit subtree and an index for uniquely identifying the unit subtree;
  a parser unit, executing on the processor, which identifies positions of a start tag and an end tag defining a start value and an end value, respectively of an attribute in the structured document to generate a cutting position list, corresponding to a hierarchical structure of an attribute value and register the cutting position list in a storage area;
  a cutting unit, executing on the processor, which separates the unit subtree and the index for referring to the unit subtree from the structured document by referring to the cutting position list to identify the start tag position and the end tag position of the unit subtree to be cut, the unit subtree including the target data; and
  a registration unit, executing on the processor, which registers the unit subtree and the index for identifying the unit subtree, separated by the cutting unit, in the separate partitions; wherein the unit subtree includes a plurality of start tags, and the index is generated from a first one of the start tags in the unit subtree,
  wherein the registration unit adds pointers to the unit subtree and the index for uniquely identifying the unit subtree to allow cross-reference between the unit subtree and the index, before registering the unit subtree and the index in the separate partitions,
  wherein in order to separate the unit subtree for registration in the separate partition by referring to the cutting position list, the cutting unit generates a subtree data list and registers the generated list in a storage area, the subtree data list including a range-defining pair in which a start position and an end position of the unit subtree included in the structured document are associated with each other and an occurrence counter in which the order of description of the unit subtree in the structured document is registered, and
  wherein the structured document is described in XML, and the database is an XMLDB which enables storage and search of XML documents.

10. An information processing apparatus, comprising:
  a processor;
  a database storing a plurality of stored values having a hierarchical structure, wherein the plurality of stored values represent data stored in a particular field of the database;
  a partition generating unit, executing on the processor, which generates a value partition, the value partition having a unit subtree, the unit subtree having target data of the plurality of stored values to be partitioned in the structured document separated and registered according to a stored value of the plurality of stored values of the target data, and generates a base partition which includes a second subtree distinct from the unit subtree and an index for uniquely identifying the unit subtree;
  a parser unit, executing on the processor, which identifies positions of a start tag and an end tag, the start tag and the end tag defining a start value and an end value, the start value and the end value each corresponding to a corresponding value of the plurality of stored values in the structured document, to generate a cutting position list corresponding to the hierarchical structure and register the cutting position list in a storage area;
  a cutting unit, executing on the processor, which separates the unit subtree and the index for referring to the unit subtree from the structured document by referring to the cutting position list to identify the start tag position and the end tag position of the unit subtree to be cut, the unit subtree including the target data;
  a registration unit, executing on the processor, which registers the unit subtree and the index for identifying the unit subtree, separated by the cutting unit, in the value and base partitions; and
  an SQL processing unit, executing on the processor, which uses the target data to search thr the unit subtree registered in the value partition; and
  a search result generating unit, executing on the processor, which generates a result of the search performed by the SQL processing unit;
  wherein the unit subtree includes a plurality of the start tags, and the index is generated from a first one of the start tags in the unit subtree;
  wherein the registration unit adds pointers to the unit subtree and the index for uniquely identifying the unit subtree to allow cross-reference between the unit subtree and the index, before registering the unit subtree and the index in the value and base partitions;

wherein in order to separate the unit subtree for registration in the value and base partitions by referring to the cutting position list, the cutting unit generates a subtree data list and registers the generated list in the storage area, the subtree data list including a range-defining pair in which a start position and an end position of the unit subtree included in the structured document are associated with each other and an occurrence counter in which the order of description of the unit subtree in the structured document is registered.

* * * * *